United States Patent [19]

Kawana

[11] Patent Number: 5,832,186
[45] Date of Patent: Nov. 3, 1998

[54] IMAGE PROCESSING SYSTEM WHICH ADDS INFORMATION TO FORMED IMAGES

[75] Inventor: Takashi Kawana, Yokohama, Japan

[73] Assignee: Canon Kabushiki Kaisha, Tokyo, Japan

[21] Appl. No.: 826,675

[22] Filed: Apr. 7, 1997

Related U.S. Application Data

[62] Division of Ser. No. 533,252, Sep. 25, 1995, Pat. No. 5,661,574.

[30] Foreign Application Priority Data

Sep. 30, 1994 [JP] Japan .................................. 6-237795

[51] Int. Cl.$^6$ ..................................................... H04N 1/387
[52] U.S. Cl. .......................... 395/109; 358/501; 358/530; 358/401; 358/443; 399/366
[58] Field of Search ............................ 395/109; 358/501, 358/401, 530, 443, 468, 448, 296, 300, 450; 399/366; 283/902

[56] References Cited

U.S. PATENT DOCUMENTS

| | | |
|---|---|---|
| 4,581,656 | 4/1986 | Wada . |
| 4,924,328 | 5/1990 | Endoh et al. . |
| 5,257,119 | 10/1993 | Funada et al. ........................... 358/438 |
| 5,323,183 | 6/1994 | Tateoka et al. . |
| 5,363,202 | 11/1994 | Udagawa et al. ....................... 358/501 |
| 5,418,602 | 5/1995 | Nishikawa . |
| 5,444,518 | 8/1995 | Hashiguchi et al ..................... 358/501 |
| 5,463,473 | 10/1995 | Yamada et al. .......................... 358/300 |
| 5,465,157 | 11/1995 | Seto et al. ............................... 358/298 |
| 5,557,416 | 9/1996 | Sasanuma et al. ...................... 358/300 |
| 5,604,596 | 2/1997 | Ukai et al. .............................. 358/401 |
| 5,621,503 | 4/1997 | Komaki et al. ......................... 399/366 |
| 5,661,574 | 8/1997 | Kawana .................................. 358/501 |

FOREIGN PATENT DOCUMENTS

| | | |
|---|---|---|
| 483936 | 5/1992 | European Pat. Off. . |
| 551016 | 7/1993 | European Pat. Off. . |

*Primary Examiner*—Scott Rogers
*Attorney, Agent, or Firm*—Fitzpatrick, Cella, Harper & Scinto

[57] ABSTRACT

An image processing apparatus supplies image data, forms an image on a medium based on the image data, and adds predetermined information to the image formed on the medium. The predetermined information is added in the apparatus by using a combination of substantially representable maximum and minimum densities.

15 Claims, 20 Drawing Sheets

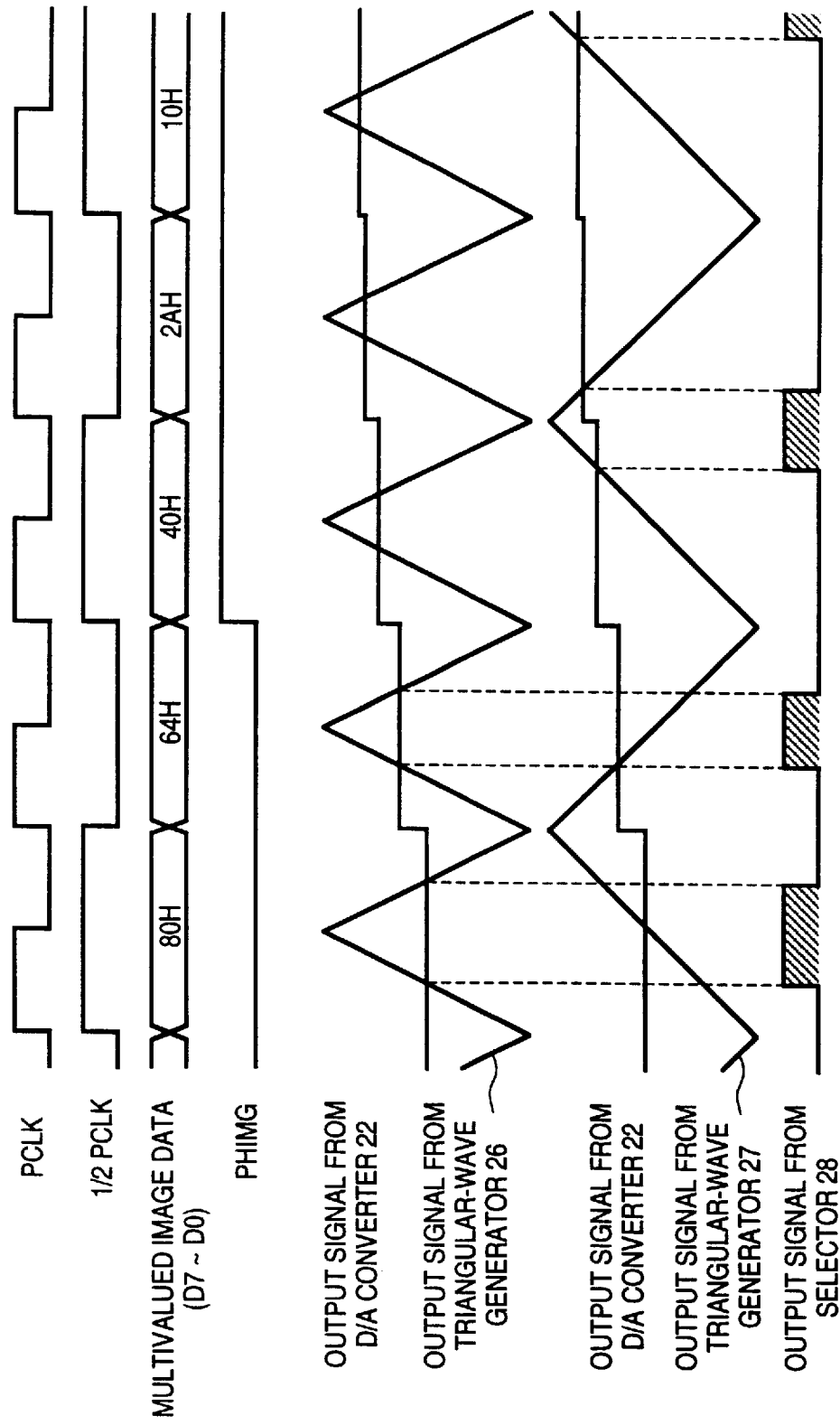

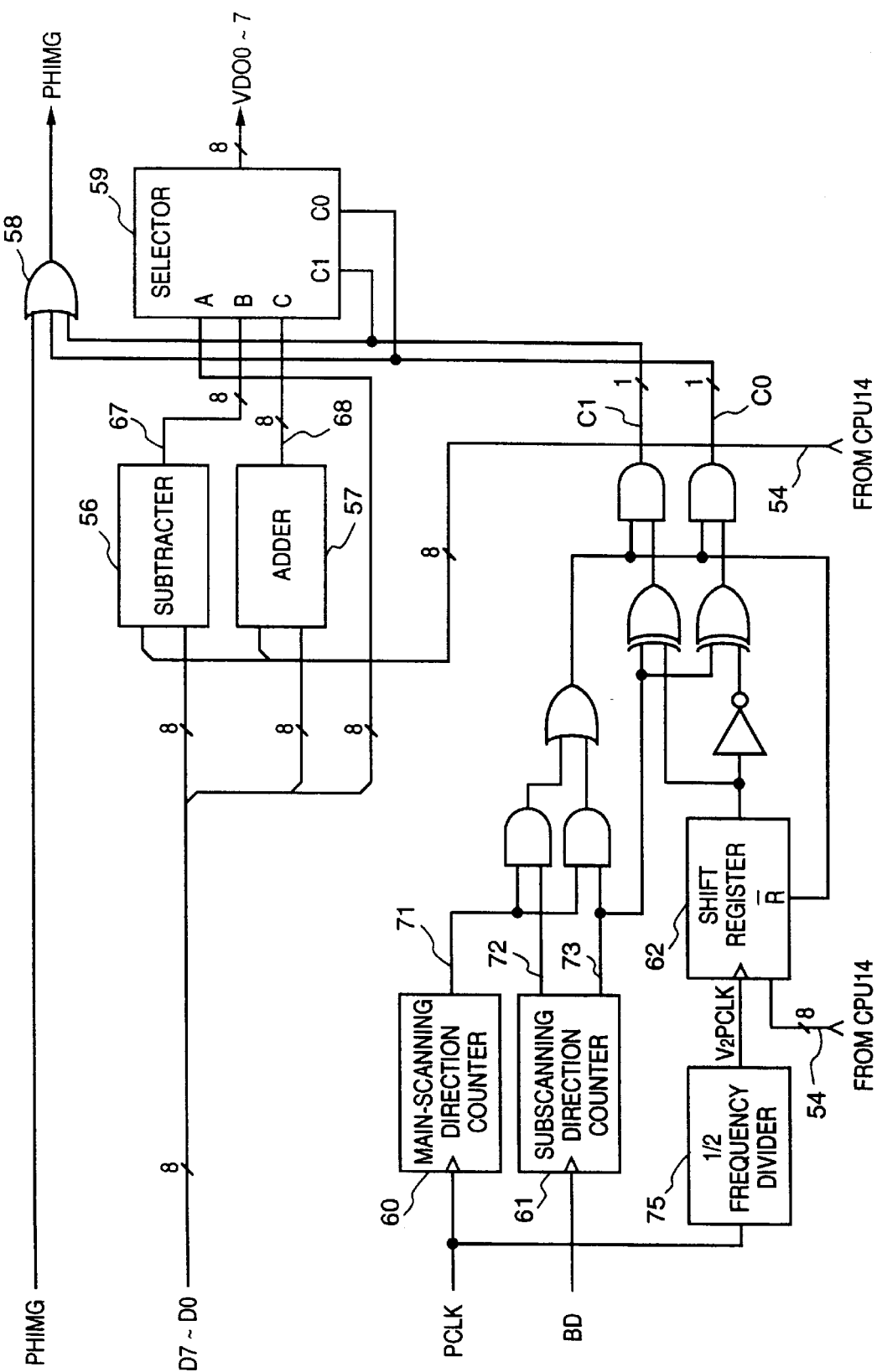

FIG. 8

| | | 2N-3 DOT | 2N-2 DOT | 2N-1 DOT | 2N DOT | 2N+1 DOT | 2N+2 DOT | 2N+3 DOT | 2N+4 DOT | 2N+5 DOT | 2N+6 DOT | 2N+7 DOT | 2N+8 DOT | 2N+9 DOT | 2N+10 DOT | 2N+11 DOT | 2N+12 DOT | 2N+13 DOT | 2N+14 DOT | 2N+15 DOT | 2N+16 DOT | 2N+17 DOT | 2N+18 DOT |
|---|---|---|---|---|---|---|---|---|---|---|---|---|---|---|---|---|---|---|---|---|---|---|
| M-2 LINE | PHIMG | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | D7~D0 | 60H | 60H | 60H | 60H | 60H | 60H | 60H | 60H | 60H | 60H | 60H | 60H | 60H | 60H | 60H | 60H | 60H | 60H | 60H | 60H | 60H | 60H |
| M-1 LINE | PHIMG | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | D7~D0 | 60H | 60H | 60H | 60H | 60H | 60H | 60H | 60H | 60H | 60H | 60H | 60H | 60H | 60H | 60H | 60H | 60H | 60H | 60H | 60H | 60H | 60H |
| M LINE | PHIMG | 0 | 0 | 0 | 0 | 1 | 1 | 1 | 1 | 1 | 1 | 1 | 1 | 1 | 1 | 1 | 1 | 1 | 1 | 1 | 0 | 0 | 0 |
| | D7~D0 | 60H | 60H | 60H | 60H | 30H | 30H | 90H | 90H | 90H | 90H | 90H | 90H | 90H | 90H | 90H | 90H | 90H | 90H | 30H | 60H | 60H | 60H |
| M+1 LINE | PHIMG | 0 | 0 | 0 | 0 | 1 | 1 | 1 | 1 | 1 | 1 | 1 | 1 | 1 | 1 | 1 | 1 | 1 | 1 | 1 | 0 | 0 | 0 |
| | D7~D0 | 60H | 60H | 60H | 60H | 30H | 30H | 90H | 90H | 90H | 90H | 90H | 90H | 90H | 90H | 90H | 90H | 90H | 90H | 30H | 60H | 60H | 60H |
| M+2 LINE | PHIMG | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | D7~D0 | 60H | 60H | 60H | 60H | 60H | 60H | 60H | 60H | 60H | 60H | 60H | 60H | 60H | 60H | 60H | 60H | 60H | 60H | 60H | 60H | 60H | 60H |
| M+3 LINE | PHIMG | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | D7~D0 | 60H | 60H | 60H | 60H | 60H | 60H | 60H | 60H | 60H | 60H | 60H | 60H | 60H | 60H | 60H | 60H | 60H | 60H | 60H | 60H | 60H | 60H |

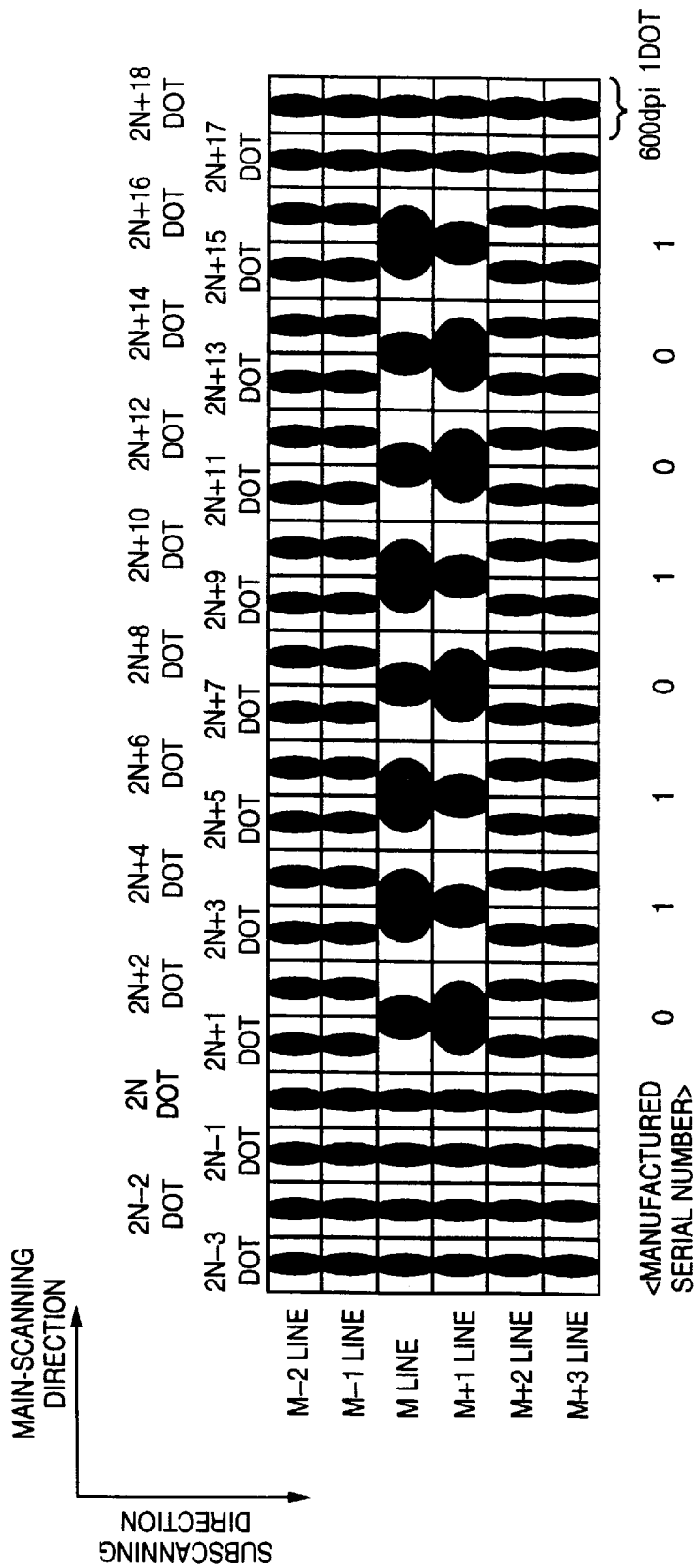

[A4 SIZE (600 DPI) PRINTING]

FIG. 12

| | | 2N-3 DOT | 2N-2 DOT | 2N-1 DOT | 2N DOT | 2N+1 DOT | 2N+2 DOT | 2N+3 DOT | 2N+4 DOT | 2N+5 DOT | 2N+6 DOT | 2N+7 DOT | 2N+8 DOT | 2N+9 DOT | 2N+10 DOT | 2N+11 DOT | 2N+12 DOT | 2N+13 DOT | 2N+14 DOT | 2N+15 DOT | 2N+16 DOT | 2N+17 DOT | 2N+18 DOT |
|---|---|---|---|---|---|---|---|---|---|---|---|---|---|---|---|---|---|---|---|---|---|---|---|
| M−2 LINE | PHIMG | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | D7~D0 | 60H | 60H | 60H | 60H | 60H | 60H | 60H | 60H | 60H | 60H | 60H | 60H | 60H | 60H | 60H | 60H | 60H | 60H | 60H | 60H | 60H | 60H |
| M−1 LINE | PHIMG | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | D7~D0 | 60H | 60H | 60H | 60H | 60H | 60H | 60H | 60H | 60H | 60H | 60H | 60H | 60H | 60H | 60H | 60H | 60H | 60H | 60H | 60H | 60H | 60H |
| M LINE | PHIMG | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | D7~D0 | 60H | 60H | 60H | 60H | 60H | FFH | FFH | FFH | FFH | FFH | FFH | FFH | FFH | FFH | FFH | FFH | FFH | FFH | 60H | 60H | 60H | 60H |
| M+1 LINE | PHIMG | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | D7~D0 | 60H | 60H | 60H | 60H | 60H | 00H | 00H | 00H | 00H | 00H | 00H | 00H | 00H | 00H | 00H | 00H | 00H | 00H | 60H | 60H | 60H | 60H |
| M+2 LINE | PHIMG | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | D7~D0 | 60H | 60H | 60H | 60H | 60H | 60H | 60H | 60H | 60H | 60H | 60H | 60H | 60H | 60H | 60H | 60H | 60H | 60H | 60H | 60H | 60H | 60H |
| M+3 LINE | PHIMG | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | D7~D0 | 60H | 60H | 60H | 60H | 60H | 60H | 60H | 60H | 60H | 60H | 60H | 60H | 60H | 60H | 60H | 60H | 60H | 60H | 60H | 60H | 60H | 60H |

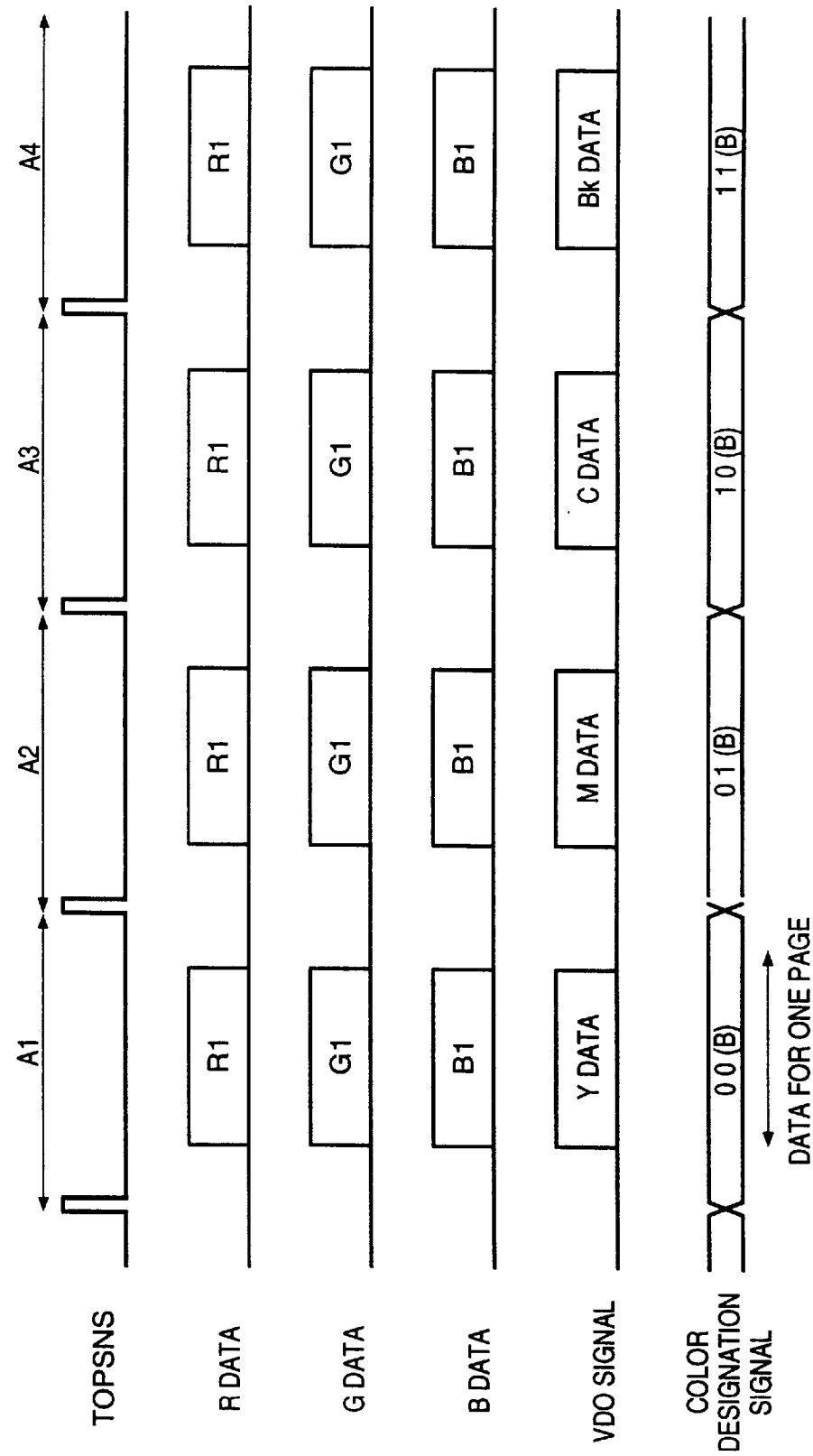

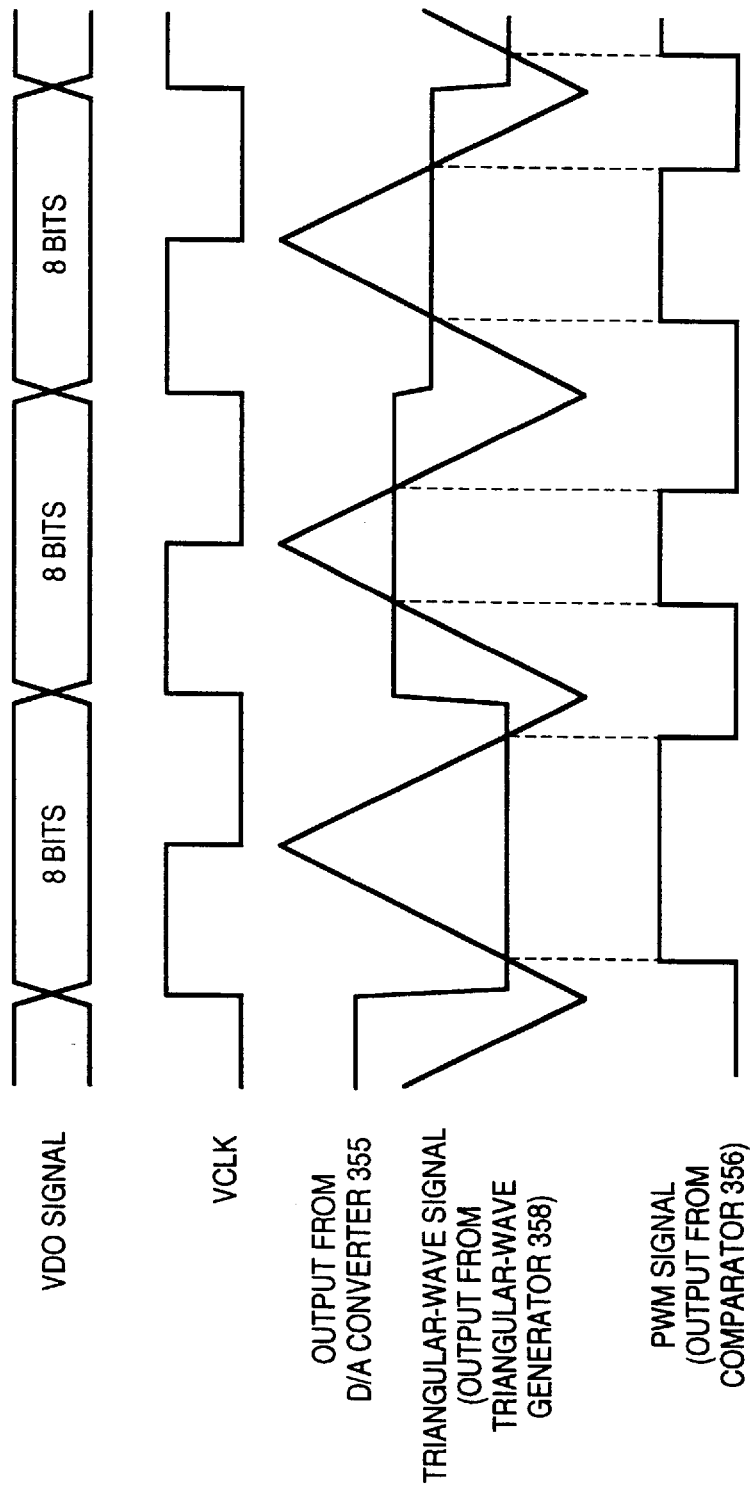

IMAGE PROCESSING SYSTEM WHICH ADDS INFORMATION TO FORMED IMAGES

This application is a division of application Ser. No. 08/533,252, filed Sep. 25, 1995, now U.S. Pat. No. 5,661,574.

BACKGROUND OF THE INVENTION

This invention relates to an image processing method and apparatus and, more particularly to an image processing method and apparatus for adding a specific pattern on an input image signal to form an output image.

Recently, color printers have become popular and been utilized as various representation means for users. Especially, a color page printer using electrophotographic method attracts public attention by its quiet operation, high image quality and high-speed printing.

One color page printer, a full-color laser-beam printer performs multi-color image formation and recording by generally-known four-step printing. At the first step, a laser beam is scanned on an electrostatic drum in a main-scanning direction, to make a first development using a first toner, and the developed latent image is transferred to a recording medium such as a recording sheet. Similarly, at the second to fourth steps, second to fourth toners are used to develop second to fourth latent images.

In these four steps, Y (yellow), M (magenta), C (cyan) and K (black) toners are used for image formation, and the four latent images are transferred onto the recording medium, thus a color image is obtained.

Next, the recording method of this conventional full-color printer will be described with reference to FIGS. 14 and 15. FIG. 14 is a cross-sectional view showing the construction of the conventional full-color printer. FIG. 15 is a block diagram showing the flows of various signals used by the printer in FIG. 14.

In FIG. 14, an electrostatic drum 201, which rotates at a fixed speed in a direction represented by the arrow, is charged by an electrostatic charger 204 to a predetermined voltage and a predetermined polarity. Next, a recording sheet P is supplied from a paper cassette 215 by a paper feeding roller 214, at predetermined timing, one sheet at a time. When a detector 202 detects the front end of the recording sheet P, a semiconductor laser 205 emits laser light L, modulated by an image signal VDO (8-bit/pixel/color), to a polygon mirror 207 driven by a scanner motor 206. The laser light L is reflected by the polygon mirror 207, then guided onto the electrostatic drum 201 via a lens 208 and a mirror 209, and sweeps on the electrostatic drum 201. On the other hand, a signal from the detector 202 (hereinafter referred to as "TOPSNS") is outputted as a vertical synchronizing signal to an image forming unit 250 as shown in FIG. 15. When a detector 217 detects the laser light L, it outputs a beam-detect signal (hereinafter abbreviated to as "BD signal"), which is a horizontal synchronizing signal, to the image forming unit 250. Then, the image signal VDO is sequentially transferred to the semiconductor laser 205 in synchronization with the BD signal.

The scanner motor 206 rotates at a fixed speed, in accordance with a signal S2 from a frequency divider 221 which divides a signal S1 from a reference oscillator 220, under the control of a motor controller 225.

The electrostatic drum 201 is scan-exposed in synchronization with the BD signal, then a first electrostatic latent image is developed by a developer 203Y having yellow toner, and a yellow toner image is formed on the electrostatic drum 201.

On the other hand, immediately before the front end of the recording sheet P reaches a transfer-start position, a predetermined transfer bias voltage of an opposite polarity to that of the toner is applied to the transfer drum 216. The yellow toner image is transferred onto the recording sheet P, and at the same time, the recording sheet P is electrostatically attached to the surface of the transfer drum 216.

Next, a second electrostatic latent image is formed on the electrostatic drum 201 by the scanning of the laser light L, then the second latent image is developed by a developer 203M having magenta toner. The position of the magenta toner image on the electrostatic drum 201 is aligned, by the TOPSNS signal, with the position of the first (yellow) toner image, and the second toner image is transferred onto the recording sheet P.

In a similar manner, a third electrostatic latent image is developed by a developer 203C having cyan toner, then the position of the cyan toner image is aligned with that of the previous magenta image, and the third toner image is transferred onto the recording sheet P. Finally, a fourth electrostatic latent image is developed by a developer 203K having black toner, the position of the black toner image is aligned with that of the previous cyan image, and the fourth toner image is transferred onto the recording sheet P.

At each step, the VDO signal for one page is sequentially outputted to the semiconductor laser 205. After each transfer, untransferred toner on the electrostatic drum 201 is scraped off by a cleaner 210.

Thereafter, as the front end of the recording sheet P, on which the four toner images have been transferred, approaches a separation claw 212, the separation claw 212 moves to contact the surface of the transfer drum 216 so as to separate the recording sheet P from the transfer drum 216. The separation claw 212 is in contact with the transfer drum 216 till the rear end of the recording sheet P is separated from the transfer drum 216, thereafter, returns to the initial position. An electrostatic discharger 211 removes the accumulated charge on the recording sheet P, thus assists separation of the recording sheet P by the separation claw 212, and reduces atmospheric discharge upon separation of recording sheet.

Finally, the developed color image on the recording sheet P is fixed by a fixing roller 213 and the recording sheet P is discharged to a tray 229.

Note that the image forming unit 250 in FIG. 15 is a generic term of all the elements in FIG. 14 excluding the semiconductor laser 205, the scanner motor 206, the polygon mirror 207 and the detectors 202 and 217.

FIG. 16 is a timing chart showing the relation between the TOPSNS signal and the VDO signal. In FIG. 16, term A1 corresponds to the first-toner color printing; A2, printing of the second-toner color printing; A3, the third-toner color printing; and A4, the fourth-toner color printing. The color printing for one page is from the term A1 to the term A4.

Next, image signal processing will be described.

FIG. 17 is a block diagram showing the functional construction of a conventional full-color printer 302. In FIG. 17, a host interface 303 receives print information 307 from an external device e.g. a host computer 301, transmits a control signal 308 included in the received print information 307 to a printer controller 304, and transmits an image signal 309 also included in the print information 307 to an image processor 305. The image processor 305 outputs a signal to drive a semiconductor laser 306. The printer controller 304 controls the image processor 305 by a control signal 310.

FIG. 18 is a block diagram showing the detailed construction of the image processor 305 shown in FIG. 17. In FIG.

18, a color processor 351 receives a 24-bit RGB image signal from the host interface 303 shown in FIG. 17, and sequentially converts the input RGB signal into a YMCK signal at predetermined timing. That is, the color processor 351 converts the input RGB signal, into an 8-bit VDO signal indicative of a Y signal on one occasion; into an 8-bit VDO signal indicative of a M signal on another occasion; into an 8-bit VDO signal indicative of a C signal on still another occasion; and into an 8-bit VDO signal indicative of a K signal on still another occasion.

FIG. 19 is a timing chart showing the color signal conversion by the color processor 351. In FIG. 19, terms A1 to A4 represent the respective toner color printing operations, as described in FIG. 16. The same color signal set (R1, G1 and B1 in FIG. 19) is used for respective four toner color printing operations. The color of each printing operation is indicated by the 2-bit color designation signal. In the color designation signal, numeral "B" added to the respective values indicates that the values are in binary representation.

The YMCK VDO signal from the color processor 351 is γ-corrected by a γ corrector 352, and outputted as an 8-bit signal, then inputted into a pulse-width modulator (hereinafter abbreviated to "PWM") 353. The PWM 353 latches the 8-bit image signal by a latch 354 in synchronization with a rising edge of an image clock (VCLK). Then the PWM 353 converts the latched digital data into corresponding analog voltage by a D/A converter 355, and inputs the analog voltage into an analog comparator 356.

On the other hand, the image clock (VCLK) is inputted into a triangular-wave generator 358, which converts the image clock into a triangular wave and outputs it to the analog comparator 356.

The analog comparator 356 compares the triangular wave from the triangular-wave generator 358 and the analog signal from the D/A converter 355, and outputs a pulse-width modulated signal.

FIG. 20 is a timing chart showing timings of various control signals related to the PWM signal generation process.

In FIG. 20, when the 8-bit image data inputted into the PWM 353 has a maximum value "FF(H)", a PWM signal of the highest level (maximum width) is outputted, while when the input 8-bit data has a minimum value "00(H)", a PWM signal of the lowest level (minimum width) is outputted.

The improved printer performance as described above enables high-quality printing, however, it poses a problem that such printers are used for criminal acts such as forgery of bank notes and securities. It is conceivable that as printers are further developed with higher image quality, this type of crimes may increase.

One method to prevent forgery is to add a coded manufactured serial number of printer onto every output from the printer. This enables to easily find the printer used in illegal printing from forged bank notes and securities, thus assists in criminal investigation.

However, in a printer having a triangular-wave generator, capable of generating a triangular wave having a plurality of frequencies (or periods) for image formation at a relatively high resolution and for image formation at a relatively low resolution, especially upon image formation at the high resolution, as a triangular wave of a high frequency (or short period) is generated, it is difficult to represent a coded manufactured serial number of the printer on formed images at a uniform density or an even density. That is, as recent technical improvement attains higher resolution image formation, overlaying of coded information becomes difficult because toner cannot be properly transferred and fixed onto paper. Unless code formation is constantly made, to interpret a printed code to define a printer used for image formation of printed matter is unreliable.

SUMMARY OF THE INVENTION

Accordingly, it is an object of the present invention to provide an image processing method for controlling an image forming apparatus capable of image formation at a plurality of resolutions and constantly adding identification information of the apparatus to formed images, and an image processing controller using the image processing method.

According to an aspect of the present invention, the foregoing object is attained by providing an image processing controller for supplying image data to an image forming apparatus capable of forming an image on a medium at a plurality of resolutions, comprising:

input means for inputting image data;

adding means for adding information for identifying the image forming apparatus, to the input image data; and control means for controlling the image forming apparatus such that the portion of the image to which the information is added is formed at a lower resolution of the plurality of resolutions.

According to another aspect of the present invention, the foregoing object is attained by providing an image processing method adopted to a controller for processing image data and supplying the processed image data to an image forming unit capable of forming an image on a medium at a plurality of resolutions, comprising:

an input step of inputting image data;

an adding step of adding information for identifying the image forming unit to the input image data;

a control step of controlling the image forming unit such that a portion of the image to which the information is added is formed at a lower resolution of the plurality of resolutions.

It is another object of the present invention to provide an image processing method for an image processing apparatus capable of image formation at a plurality of resolutions and constantly adding identification information of the apparatus onto the formed images, and the image processing apparatus using the image processing method.

According to an aspect of the present invention, the foregoing object is attained by providing an image processing apparatus capable of forming an image on a printing medium at a plurality of resolutions comprising:

input means for inputting image data;

image forming means for forming an image based on the image data; and adding means for adding information for identifying the apparatus to an image represented by the input image data, wherein a portion of the image to which the information is added is formed at a lower resolution of the plurality of resolutions.

According to another aspect of the present invention, the foregoing object is attained by providing an image processing method adopted to an image processing unit capable of forming an image in a plurality of resolutions comprising:

an input step of inputting image data;

an adding step of adding information for identifying the unit to the input image data;

an image forming step of forming an image based on the image data having the added information;

a control step of controlling image formation at the image forming step such that a portion of the image to which the information is added is formed in a lower resolution of the plurality of resolutions.

In accordance with the present invention as described above, information to identify the image forming apparatus is added to, e.g., a part of input multi-color image signal, and to compensate modulation in the multi-color image signal caused by the addition of information, reverse modulation (i.e., if image data has been changed to indicate an increased density value, the next image data is changed to indicate a decreased density value) is made around the information-added portion of the image signal. Then, the multi-color image signal having a modulated portion by addition of identification information and the reverse-modulated portion is used for image formation.

The present invention is particularly advantageous since it provides an image processing controller, which constantly adds identification information of the image forming apparatus, capable of image formation at a plurality of resolutions, and an image processing apparatus integrating the image processing controller.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a timing chart showing timings of various control signals relating to PWM signal generation process by the signal processor 4 in a case where a screen angle is "zero";

FIG. 7 is a block diagram showing the detailed construction of a trace pattern processor 53;

FIG. 8 is an example of multivalued image data (D0–D7) values, corresponding to each pixels of a 600 dpi image, and attribute designation signal (PHIMG) values;

FIG. 9 is an output example of a 600 dpi toner image having a coded manufactured serial number of printer represented at a predetermined modulation density;

FIG. 12 is another example of multivalued image data (D0–D7) values, corresponding to each pixels of a 600 dpi image, and attribute designation signal (PHIMG) values;

FIG. 19 is a timing chart showing color-signal conversion processing performed by the color processor 351; and FIG. 20 is a timing chart showing various control signals relating to PWM signal generation process.

DETAILED DESCRIPTION OF THE PREFERRED EMBODIMENTS

Preferred embodiments of the present invention will now be described in detail in accordance with the accompanying drawings.

[hereinafter copied or arranged from C949]

Figure 1:
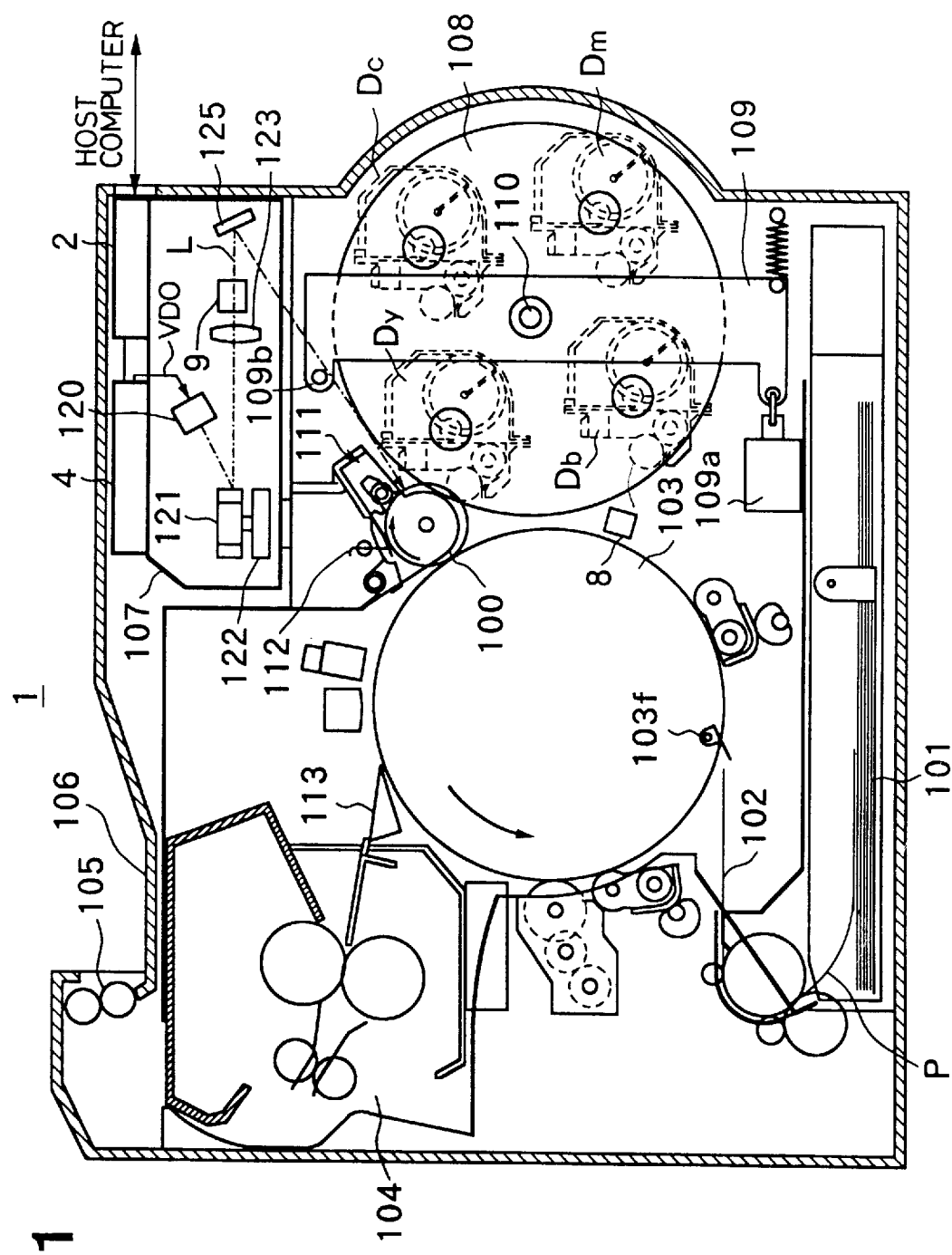
FIG. 1 is a cross-sectional view showing the construction of a color laser-beam printer as a typical embodiment of the present invention.

FIG. 1 is a cross-sectional view showing the construction of a color laser-beam printer (hereinafter referred to as "CLBP" or "printer") 1 as a typical embodiment of the present invention. The printer has a maximum 600 dot/inch (dpi) resolution. It performs image recording based on multivalued data where each pixel of each color component is represented by eight bits.

In FIG. 1, a recording sheet 102 supplied from a paper feeder 101 is caught by a gripper 103f at its end and held around a transfer drum 103. At this time, a detector 8 detects the end portion of the recording sheet 102, and a vertical synchronizing signal (to be described later) is generated based on a detection signal from the sensor 8. Latent images of respective colors formed by an optical unit 107 on an image holder (hereinafter referred to as "electrostatic drum") 100 are developed by respective developers Dy, Dc, Db and Dm, and transferred onto the recording sheet 102 on the transfer drum 103, to be a multiple-color image.

Thereafter, the recording sheet 102 is removed from the transfer drum 103, then fixed by a fixing unit 104, and discharged from a paper discharging unit 105 to a paper discharging tray 106.

The developers Dy, Dc, Db and Dm respectively have a rotation support at both ends, so that they are rotatably held by a developer selection mechanism 108 with the rotation support as the rotational axis. By virtue of this arrangement, the developers Dy, Dc, Db and Dm can maintain a constant attitude even though the developer selection mechanism 108 rotates around a shaft 110. After a selected developer reaches a developing position, a solenoid 109a moves the developer selection mechanism 108 with the developers toward the electrostatic drum 100, by pulling a selection mechanism holding frame 109 with respect to a support 109b.

Next, color image formation by the color laser-beam printer having the above construction will be described.

First, an electrostatic charger 111 charges the electrostatic drum 100 to a predetermined polarity, and exposure by a laser beam L forms a latent image of, e.g., M (magenta) color, on the electrostatic drum 100. The latent image is developed using M color developer Dm as a first toner image of M color. On the other hand, a transfer sheet P is supplied at predetermined timing, and a transfer bias voltage (+1.8 kV) having an opposite polarity to that of the toner (e.g., positive) is applied to the transfer drum 103, then the first toner image on the electrostatic drum 100 is transferred onto the transfer sheet P, at the same time, the transfer sheet P is electrostatically-attached around the transfer drum 103. Thereafter, a cleaner 112 removes residual M toner from the electrostatic drum 100, as preparation for the next development.

Next, the laser beam L forms a second latent image of C (cyan) color on the electrostatic drum 100, then the development of the second latent image is performed using the C color developer Dc. The second C color toner image is transferred onto the transfer sheet P in a manner such that the position of the second toner image corresponds to that of the first M color toner image previously transferred on the transfer sheet P. Upon transfer of the second toner image, immediately before the transfer sheet P reaches a transfer position, a +2.1 kV bias voltage is applied to the transfer drum 103.

Similarly, a third Y (yellow) color latent image and a fourth K (black) color latent image are sequentially formed on the electrostatic drum 100, and sequentially developed using the developers Dy and Db, thus, the developed third and fourth toner images are sequentially transferred onto the transfer sheet P such that the respective positions of the third and fourth toner images correspond to the position of the previously transferred image. In this manner, the four color toner images are overlaid on the transfer sheet P. Upon transfer of the third and fourth toner images, immediately before the transfer sheet P reaches the transfer position, a +2.5 kV bias voltage and a +3.0 kV bias voltage are respectively applied to the transfer drum 103.

As described above, the transfer bias voltage at one transfer is raised at the next transfer, so as to avoid degradation of transfer efficiency. When the transfer sheet is separated from the electrostatic drum 100, the surface of the transfer sheet is charged, and have opposite polarity to the transfer bias voltage (the surface of the transfer drum holding the transfer sheet is charged to some extent due to atmospheric discharge). This electric charge accumulates by transfer operation, and degrades the electric field in transfer process if the transfer bias voltage is constant.

Upon transfer of the fourth toner image, when the end portion of the transfer sheet reaches the transfer-start position (including immediately before/after this point in time), a direct bias voltage +3.0 kV, having the same polarity and the same potential as those of the transfer bias voltage applied upon the fourth toner image transfer is added to an effective alternating voltage 5.5 kV (frequency: 500 Hz) and applied to the electrostatic charger 111. In this manner, upon the fourth toner image transfer, when the end portion of the transfer sheet reaches the transfer-start position, the charger 111 is operated so as to prevent transfer unevenness. Especially in full-color image transfer, even minute transfer unevenness becomes obvious color difference. For this reason, it is necessary to apply the predetermined bias voltage to the charger 111 to perform discharging operation.

Thereafter, as the end portion of the transfer sheet P, on which the four toner images are overlaid, approaches a separation position, a separation claw 113 moves to contact the surface of the transfer drum 103, thus separates the transfer sheet P from the transfer drum 103. The end portion of the separation claw 113 is kept in contact with the transfer drum surface, then moves away from the transfer drum 103 to the initial position. The charger 111 operates to discharge the accumulated electric charge on the transfer sheet (having opposite polarity to that of the toner) from the point where the upper end portion of the transfer sheet P reached the transfer-start position of the final color (fourth color) to the point where the bottom end of the transfer sheet moves away from the transfer drum 103, thus assists the separation of the transfer sheet and reduces atmospheric discharge upon separation. It should be noted that when the rear end of the transfer sheet reaches a transfer-end position (the grip formed by the electrostatic drum 100 and the transfer drum 103), the transfer bias voltage applied to the transfer drum 103 is turned off (to ground potential). At the same time, the bias voltage applied to the charger 111 is turned off. Next, the separated transfer sheet P is conveyed to a fixing unit 104, where the toner images are fixed to the transfer sheet P, and the transfer sheet P is discharged to the paper discharging tray 106.

Next, image formation by laser-beam scanning will be described below.

In FIG. 1, the optical unit 107 comprises a detector 9, a semiconductor laser 120, a polygon mirror 124, a scanner motor 122, a lens 123 and a mirror 125. As the recording sheet P is supplied and its end portion is conveyed to the transfer drum, an image signal VDO for one page is outputted to the semiconductor laser 120 in synchronization with the conveyance of the recording sheet P. The semiconductor laser 120 emits a laser beam L, modulated by the image signal VDO, to the polygon mirror 121 rotated by the scanner motor 122. The emitted laser beam L is guided via the lens 123 and the mirror 125 to the electrostatic drum 100. As the laser beam L is emitted, the detector 9 provided on a main-scanning axis detects the laser beam L and outputs a beam detect (hereinafter abbreviated to "BD") signal as a horizontal synchronizing signal. The electrostatic drum 100 is scan-exposed by the laser beam L in synchronization with the BD signal, to form an electrostatic latent image.

The color laser-beam printer of the present embodiment performs image output at maximum 600 dpi resolution through the above-described image forming process.

Input data to this apparatus may be color image data (e.g., data in RGB representation) generated by a host computer or image data generated by an image-data generating device (e.g., still image recorder) and stored in some storage medium. As shown in FIG. 1, the present apparatus has a printer controller 2 for receiving image information from the host computer and generating image data, and a signal processor 4 for processing the generated image data.

Figure 2:
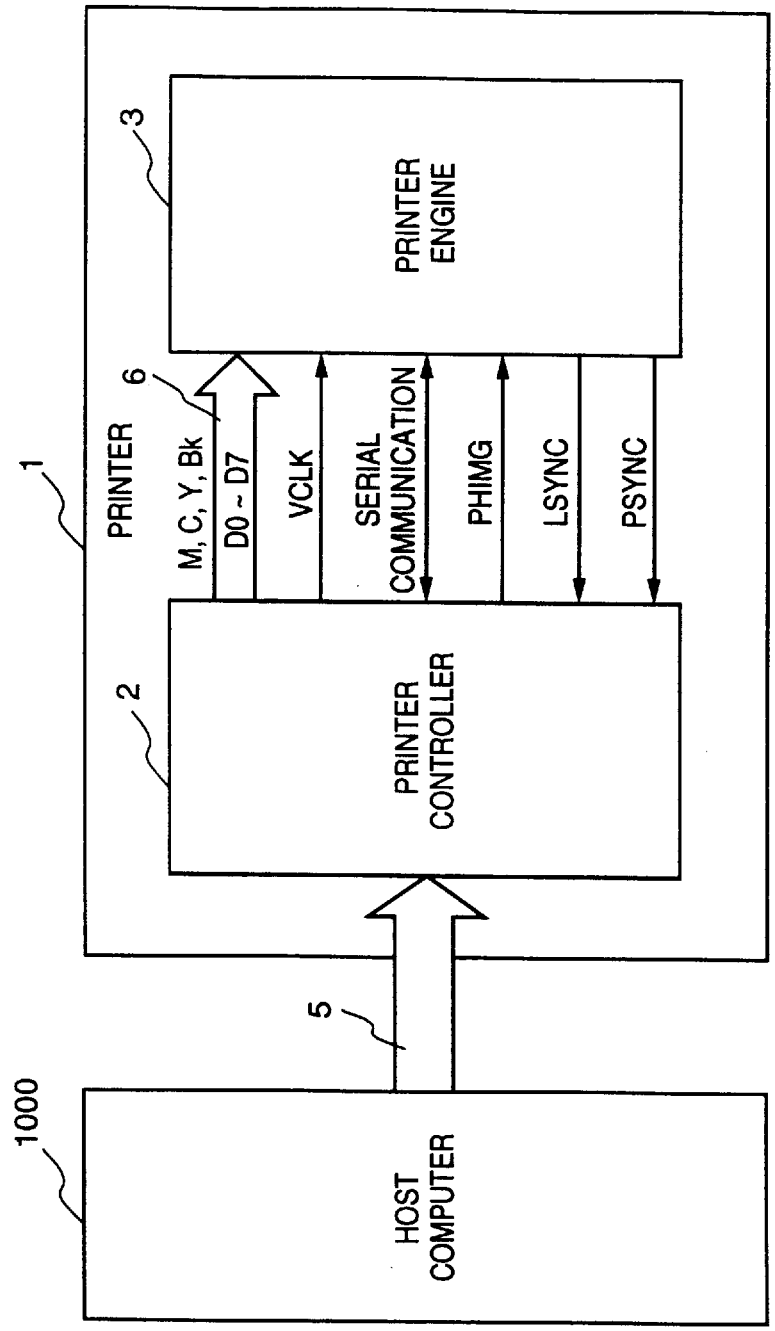
FIG. 2 is a block diagram showing the functional construction of a printer 1 in FIG. 1.

FIG. 2 is a block diagram showing the functional construction of a printer 1 according to the present embodiment. In FIG. 2, the printer 1 comprises the printer controller 2 and a printer engine 3. The printer controller 2 receives image information 5 in predetermined description language from a host computer 1000 and interprets the information 5, then outputs a YMCBk image signal 6 where each color component is represented by eight bits (D0 to D7). Alternatively, the host computer 1 outputs bit data such as RGB data read by an image reader as the image information 5. In this case, the printer controller 2 processes the data without interpretation.

The printer controller 2 and the printer engine 3 exchange various image signals as well as the image signal 6 in the form of serial communication. The image signals include a page (subscanning direction) synchronizing signal (PSYNC) and a main-scanning direction synchronizing signal (LSYNC) from the printer engine 3 to the printer controller 2, one-bit attribute designation signal (PHIMG) and data transfer clock (VCLK) from the printer controller 2 to the printer engine 3. The attribute designation signal (PHIMG) is a signal designating line density of an image outputted from the printer. When PHIMG="H", the designated density is 300 dpi, while when the PHIMG="L", the designated density is 600 dpi.

The printer controller 2 outputs the 8-bit/color component image signal 6 with the one-bit attribute designation signal (PHIMG) in synchronization with the data transfer clock (VCLK).

Figure 3:
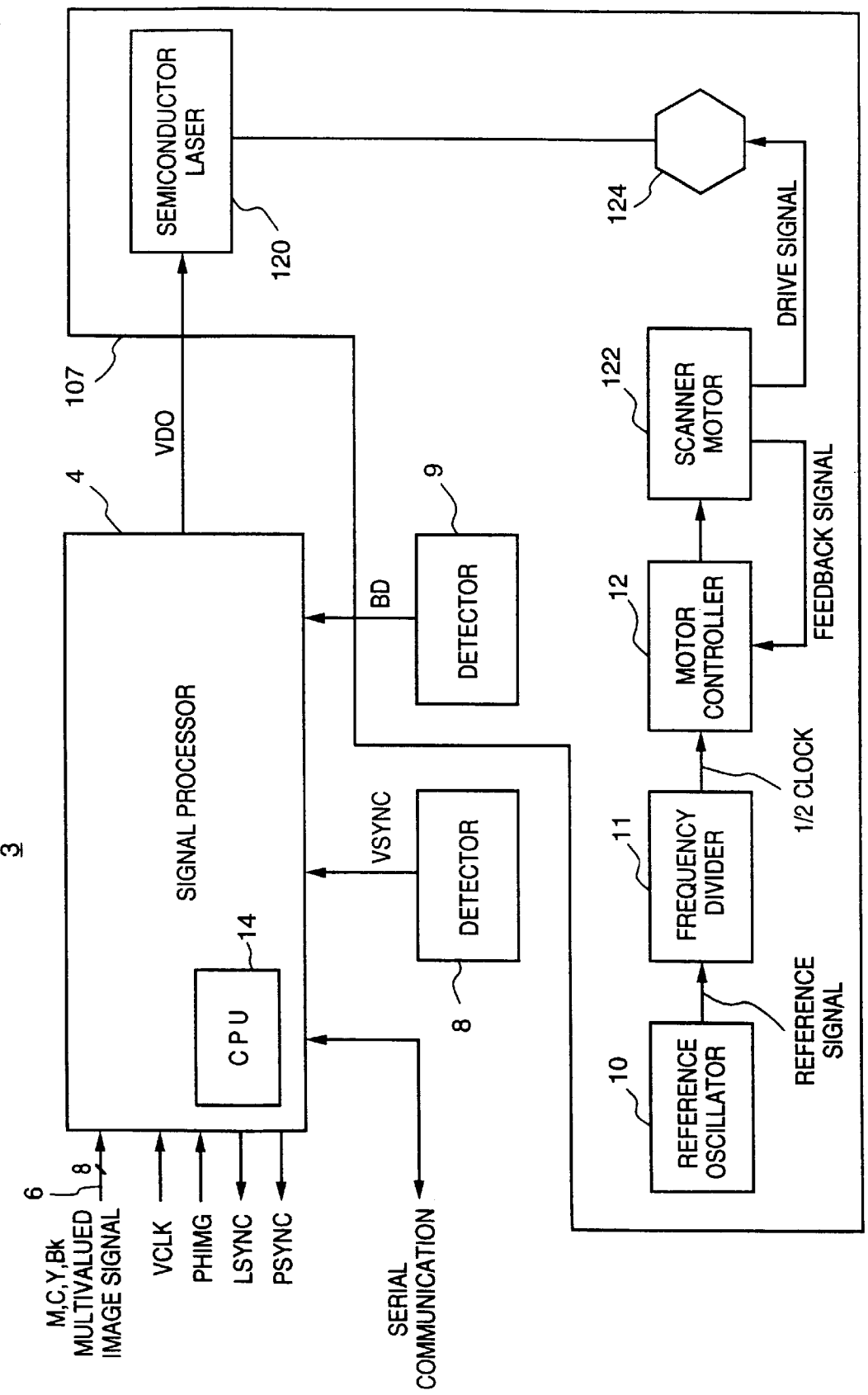
FIG. 3 is a block diagram showing the functional construction of a printer engine 3 in FIG. 2.

FIG. 3 is a block diagram showing the functional construction of the printer engine 3 according to the present embodiment.

In FIG. 3, a reference clock from a reference oscillator 10 included in the optical unit 107 is divided by a frequency divider 11, and the scanner motor 122 is rotated by a motor controller 12 (incorporating a well-known phase controller (not shown)) at a fixed speed so that the phase difference between the divided clock and a feedback signal from the scanner motor 122 has a predetermined phase difference. The rotation of the scanner motor 122 is transmitted to the polygon mirror 121 so that the polygon mirror 121 rotates at the fixed speed.

The transfer drum 103 is rotated by a drive motor (not shown) at a fixed speed. The detector 8 detects the end portion of the recording sheet P on the transfer drum 103, and outputs the vertical synchronizing signal (VSYNC) to the signal processor 4 to define the end portions of the respective color images. After the vertical synchronizing signal has been outputted, the detector 9 generates a beam detect (BD) signal as the horizontal synchronizing signal (HSYNC). The image signal (VDO) is sequentially transmitted to the semiconductor laser 120 in synchronization with the BD signal.

A CPU 14, integrated in the signal processor 4, performs serial communication with the printer controller 2 and exchanges control signals to bring the operation of the printer controller 2 and that of the printer engine 3 into synchronization.

Figure 4:
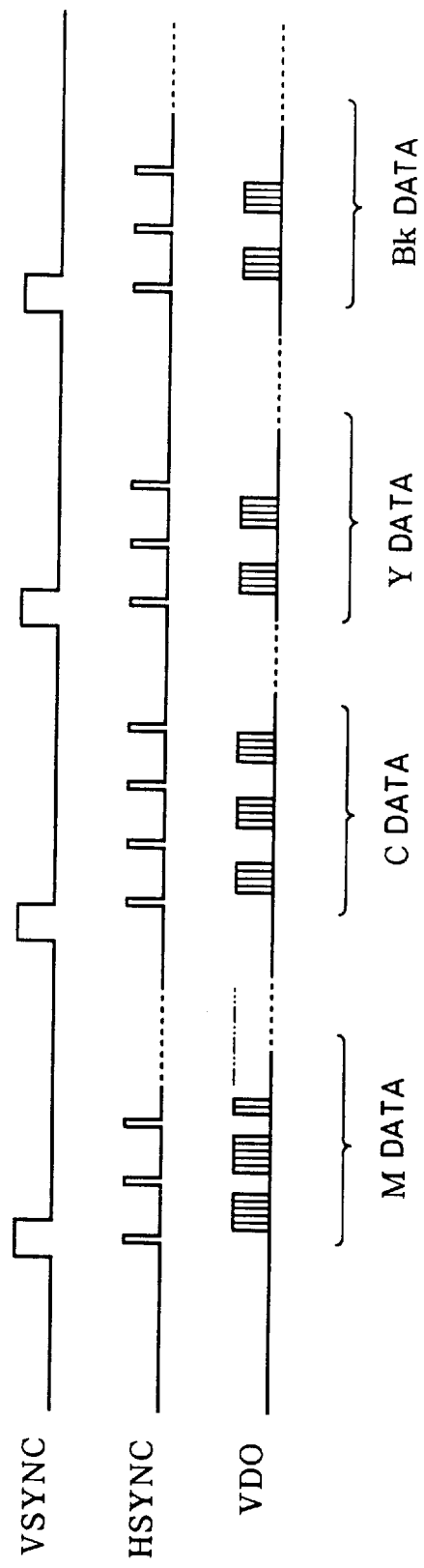
FIG. 4 is a timing chart showing timings of a vertical synchronizing signal (VSYNC), a horizontal synchronizing signal (BD) and an image signal (VDO) in image formation process.

The timings of the vertical synchronizing signal (VSYNC), the horizontal synchronizing signal (BD) and the image signal (VDO) in the image formation process are as shown in FIG. 4.

Figure 5:
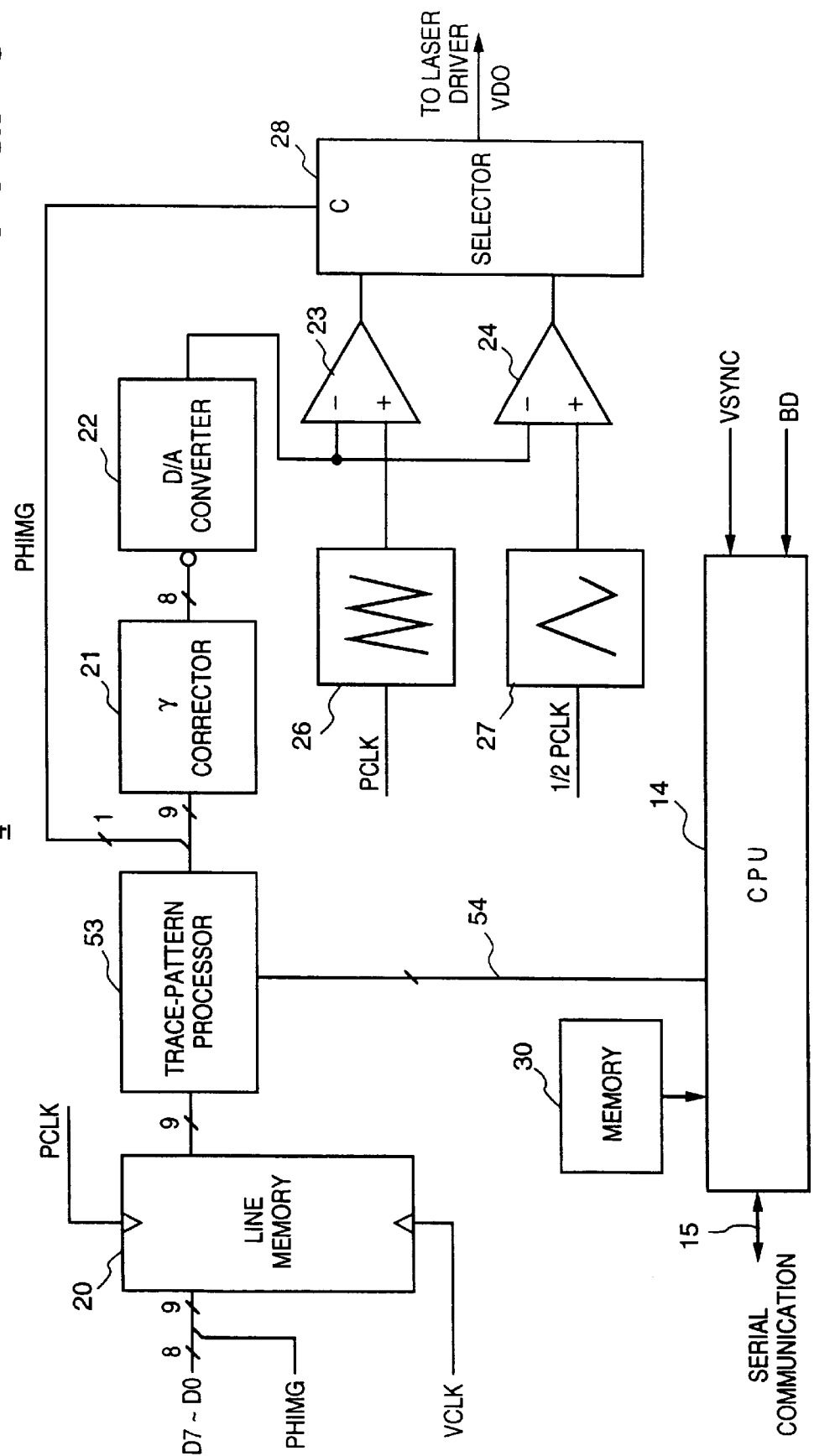
FIG. 5 is a block diagram showing the construction of a signal processor 4.

FIG. 5 is a block diagram showing the construction of the signal processor 4. The signal processor 4 is briefly divided into a line memory 20, a trace-pattern processor 53 and a PWM-halftone processor which performs pulse-width modulation.

Multivalued image data (D0–D7) outputted from the printer controller 2 is stored with its attribute designation signal (PHIMG) into the line memory 20 in accordance with the data transfer clock (VCLK), thereafter, the stored image data is read out of the line memory 20 in accordance with the image clock (PCLK) of the printer engine 3.

The PWM-halftone processor comprises a γ corrector 21, a D/A converter 22, comparators 23 and 24, triangular-wave generators 26 and 27 and a selector 28. The multivalued image data from the line memory 20 is γ-corrected by the γ corrector 21, then converted by the D/A converter 22 into an analog signal, and inputted into the negative input terminals (−) of the comparators 23 and 24. On the other hand, output signals from the triangular-wave generators 26 and 27 are inputted into the positive input terminals (+) of the comparators 23 and 24 in accordance with the image clock (PCLK) and ½PCLK divided from the image clock (PCLK).

The comparators 23 and 24 respectively compare these two signals, and generate a signal having a pulse width corresponding to the multivalued image signal. The comparator 23 outputs a PWM signal to form a 600 dpi image, while the comparator 24 outputs a PWM signal to form a 300 dpi image. These two output signals are inputted into the selector 28.

The selector 28 makes selection based on an input attribute designation signal (PHIMG). If PHIMG="H", the selector 28 selects the PWM signal (used in forming a 300 dpi image) from the comparator 24, while if PHIMG="L", selects the PWM signal (used in forming a 600 dpi image) from the comparator 23, and outputs the selected signal as an image signal (VDO) to the semiconductor laser 120.

FIG. 6 is a timing chart showing timings of various control signals related to the PWM-signal generation process by the signal processor 4 in a case where a screen angle is "zero".

The trace-pattern processor 53 receives information on an ID number (e.g., a manufactured serial number added when delivered from a factory) unique to the printer, stored in the memory 30, via a signal line 54, under the control of the CPU 14, encodes the information, and overlays the coded ID information on every output data. As a result, formed images have an overlaid image coded from the printer's own ID number.

FIG. 7 is a block diagram showing the detailed construction of the trace-pattern processor 53. In FIG. 7, numeral 56 denotes a subtracter which subtracts a modulation density value (e.g. "30") to modulate the ID information (e.g., manufactured serial number) unique to the printer supplied via the signal line 54 under the control of the CPU 14 from the multivalued image data (D0–D7); 57, an adder which adds the modulation density value to the multivalued image data (D0–D7); 58, an OR circuit which calculates logical OR of the attribute designation signal (PHIMG) and control signals C0 and C1, and outputs the calculation results (also referred to as attribute designation signals (PHIMG)); and 59, a selector which inputs an output 67 from the subtracter 56 into its input terminal B, inputs an output 68 from the adder 57 into input terminal C, inputs the multivalued image data (D0–D7) into its input terminal A, selects one of the input signals in accordance with the values of control signals C0 and C1, and outputs the selected signal (also referred to as multivalued image data (D0–D7).

It should be noted that in this embodiment, the printer's manufactured serial number is represented as a 8-bit binary code "01101001".

If the values of the control signals C0 and C1 are both "0", the selector 59 selects the signal (multivalued image data (D0–D7)) inputted into the input terminal A; if the control signal C0 value is "1" and the control signal C1 value is "0", the selector 59 selects the signal (output 68 from the adder 57) inputted into the input terminal C; and if the control signal C0 value is "0" and the control signal C1 value is "1", the selector 59 selects the signal (output 67 from the subtracter 56) inputted into the input terminal B.

Numeral 60 denotes a main-scanning direction counter. Regarding a main-scanning direction, in counting of image clocks (PCLK), when the dot position for data processing comes to a position at which the printer's manufactured serial number is overlaid, the counter 60 outputs an output signal 71 having a value "1" during a period for 16 pulses of the image clock (PCLK). Numeral 61 denotes a subscanning direction counter. Regarding a subscanning direction, in counting BD signals (horizontal synchronizing signals), when a line position comes to a position (M) in which the printer's manufactured serial number is overlaid, the counter 61 outputs an output signal 72 having a value "1", and when the line position comes to the next line position (M+1), the counter 61 outputs an output signal 73 having a value "1". Numeral 62 denotes a shift register which latches a parallel signal of the printer's manufactured serial number "01101001" transferred from the CPU 14 via the signal line 54, and outputs each bit information of the serial number as a serial signal in synchronization with a clock (½PCLK) half of the image clock (PCLK). The shift register 62 is reset while the signal 74 value is "0", and it starts parallel-serial conversion when the signal value becomes "1". Numeral 75 denotes a ½ frequency divider for dividing the image clock into ½ frequencies.

Note that when the subscanning direction counter 61 outputs the output signal 72 for M-th line detection having a value "1", the value of the output signal 73 for (M+1)-th line detection is "0". On the other hand, the value of the output signal 73 for (M+1)-th line detection is "1", the output signal 72 value for M-th line detection is "0". The output signals 72 and 73, the output signal 71 from the main-scanning direction counter 60 and the output signal from the latch 62 are inputted into a logic circuit as shown in FIG. 7, and becomes the control signals C0 and C1.

That is, at a dot position and a line position for overlaying the printer's manufactured serial number, when the output signal from the latch 62 has a value "1" (i.e., the bit value of the printer's manufactured serial number is "1"), the control signal C0 value is "1", while the control signal C1 value is "0". On the other hand, at a dot position and a line position for overlaying the printer's manufactured serial number, when the output signal from the latch 62 has a value "0" (i.e., the bit value of the printer's manufactured serial number is "0"), the control signal C0 value is "0", while the control signal C1 value is "1". Note that except the above dot and line positions, the output signals 71 to 73 have a value "0", and as a result, the control signals C0 and C1 both have a value "0".

In a case where the control signal C0 value or the control signal C1 value is "1" regardless of the value of the attribute designation signal (PHIMG), the value of the output from the OR circuit 58 is "1".

Figure 10:
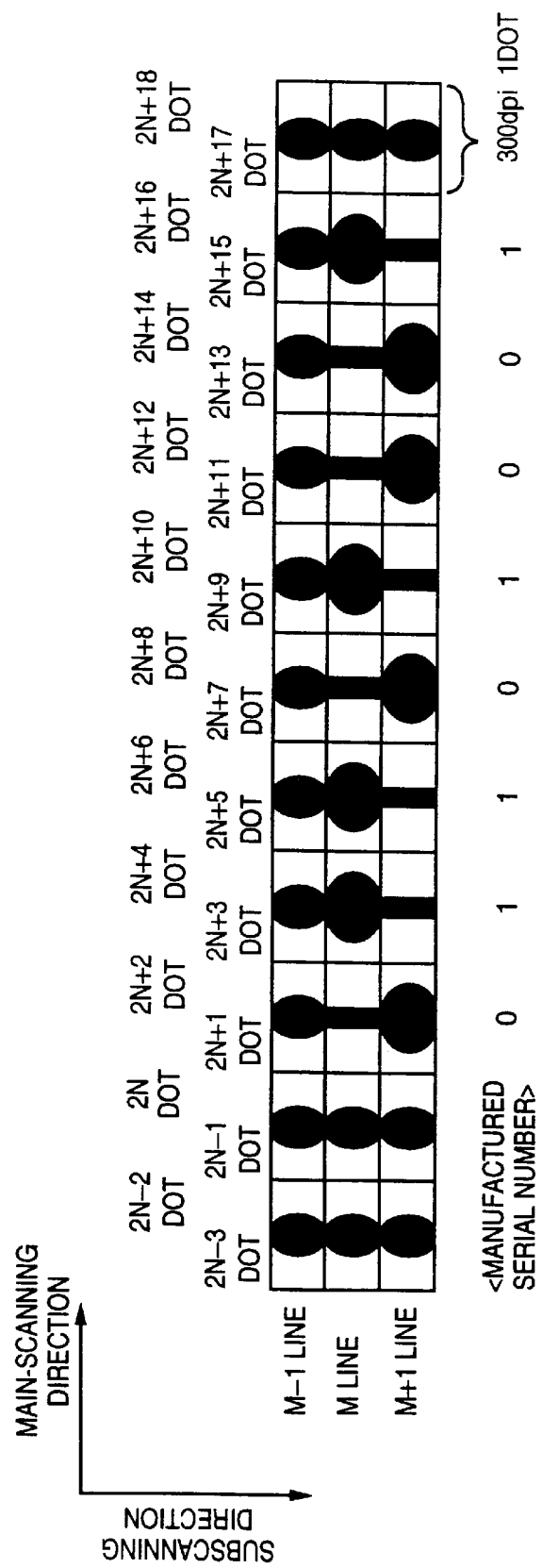
FIG. 10 is an output example of a 300 dpi toner image having a coded manufactured serial number of printer represented at a predetermined modulation density.

Next, an image signal, where the printer's manufactured serial number is overlaid, outputted from the trace-pattern processor 53 will be described with reference to FIGS. 8 to 10 showing each pixel in the main-scanning and subscanning directions.

FIG. 8 shows multivalued image data (D0–D7) values (H: hexadecimal representation) and the attribute designation signal (PHIMG) values corresponding to each pixel of the image shown in FIG. 9.

In FIGS. 9 and 10, solid black circular dots and oval dots represent image-formed toner on a recording sheet. Note that FIGS. 9 and 10 show toner images where coded the printer's manufactured serial number "01101001 (8 bits)", expressed by predetermined density values, is overlaid on the input image. In FIG. 9, the input PHIMG signal value is "0" and the pixels represent a 600 dpi image; in FIG. 10, the input PHIMG signal value is "1", and the pixels represent a 300 dpi image. In these figures, the number of lines in the subscanning direction is corresponding to 600 dpi resolution.

The main-scanning direction counter 60 outputs the output signal 71 having a value "1" at (2N+1) to (2N+16) dot positions (ranges where the printer's manufactured serial number is overlaid in the main-scanning direction). On the other hand, the subscanning direction counter 61 outputs the output signal 72 having a value "1" in M-th line in which the printer's manufactured serial number in the subscanning direction is overlaid, and outputs the output signal 73 having a value "1" at (M+1)-th line. At this time, the value of the output signal from the OR circuit 58 is forcibly set to "1" regardless of the value of the attribute designation signal (PHIMG).

In this embodiment, as shown in FIG. 8, assuming that the input multivalued image data values from (2N+1) dot to (2N+16) dot in the M-th line are "60[H]", regarding the printer's manufactured serial number "01101001", when the first (leftmost) code value "0" is represented by the (2N+1) dot and (2N+2) dot, the modulation density value ("30") transferred from the CPU 14 is subtracted from the original multivalued image data value, and the resulted value is "30[H]". Then, to compensate the subtracted value in the (M+1)-th line, the original multivalued image data value is changed into a value "90[H]" where the modulation density value ("30") from the CPU 14 is added to the original multivalued image data value. Next, to represent the next value "1" of the printer's manufactured serial number is by (2N+3) and (2N+4) dots, the modulation density value ("30") is added to the original multivalued image data value, then the resulted value is "90[H]", and to compensate the added value in the (M+1)-th line, the modulation density value ("30") is subtracted from the original multivalued image data value.

Hereinafter, the input multivalued image data values are changed to represent the printer's manufactured serial number, each value by two dots. Regarding the (M+1)-th line data, to compensate the increased/decreased pixel value due to the modulation, the original multivalued image data value is changed. In this manner, this embodiment represents the printer's manufactured serial number by changing the density of original multivalued image data, and compensates the difference between the changed density value and the original data value upon image formation of the next line.

FIG. 9 shows the output result from the 600 dpi image formation based on multivalued image data, partially-modulated by the above processing, in a case where the value of the PHIMG signal of the original image data is "0". As it is apparent from FIG. 9, even in case of 600 dpi image formation, the pattern of the printer's manufactured serial number is overlaid at 300 dpi resolution in the main-scanning direction.

On the other hand, FIG. 10 shows the output result from image formation, in a case where the value of the PHIMG signal of the original image data is "1", and all the data including the printer's manufactured serial number data is image-formed at 600 dpi by two dots in the main-scanning direction, and also image formed at 600 dpi in the subscanning direction.

Figure 11:
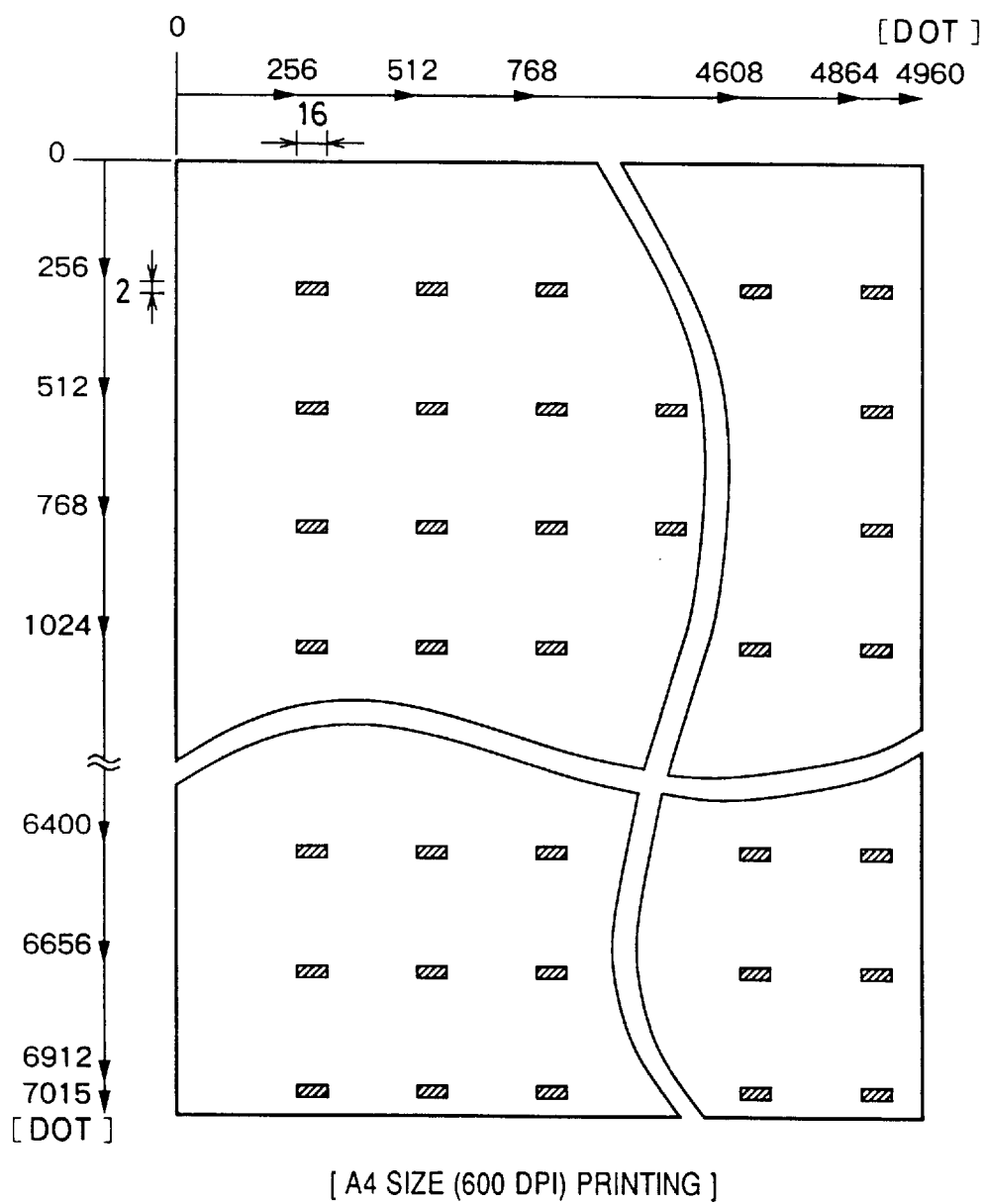
FIG. 11 is an example of an output pattern of manufactured serial number of printer where printer serial number is overlaid at fixed intervals in a main-scanning direction and a subscanning direction on a recording sheet.

The pattern of the printer's manufactured serial number formed in this manner is overlaid on the recording sheet, at predetermined intervals in the main-scanning and subscanning directions, as shown in FIG. 11. Note that in FIG. 11, hatched portions represent the pattern of the printer's manufactured serial number.

Accordingly, as a specific pattern to identify the printer is overlaid on input image data regardless of output resolution, further, the specific pattern is overlaid at a lower resolution (e.g., 300 dpi with respect to 600 dpi), the size of respective pixels to represent the specific pattern becomes larger. Thus, the pixels indicated by the density values are exactly represented as an image.

Further, in the line following the line where the specific pattern is overlaid, the image data values are changed so as to compensate the density changes due to the overlaying. Thus, the entire image macroscopically has no density change. That is, as the above processing does not influence the overlook of the formed image, the output image looks like an image outputted without overlaying of specific pattern. On the other hand, the overlaying of specific pattern as described above and compensation of the overlaying macroscopically cause a density difference, twice greater/smaller than the modulation density value between the pattern-overlaid line and the next line. Therefore, if the formed image is read using e.g. an image reader, the specific pattern can be more accurately read.

Thus, even if forgery of banknotes or securities is attempted using a printer like the present embodiment, the printer can be identified by its output results with higher reliability. This greatly helps criminal investigation.

Figure 13:
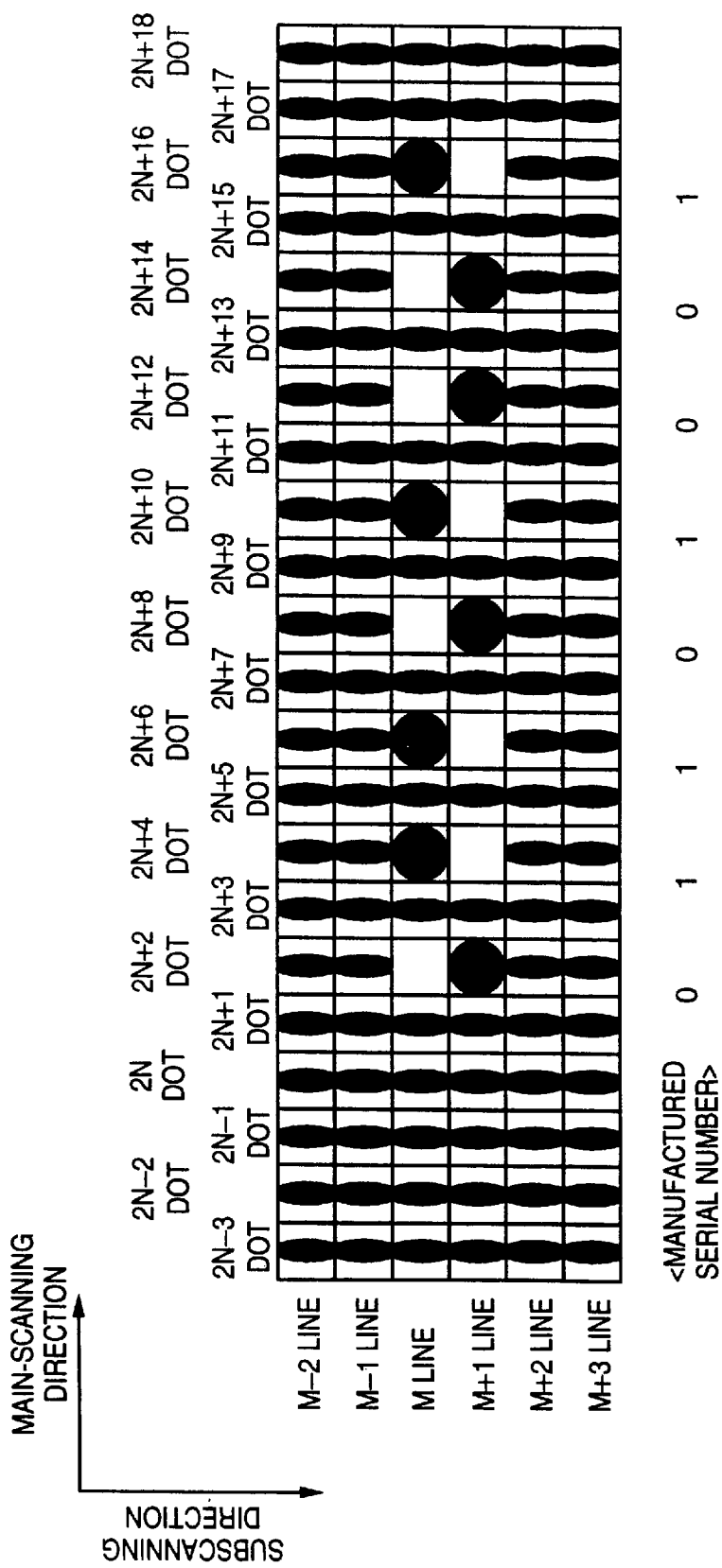
FIG. 13 is an output example of a 600 dpi toner image having a coded manufactured serial number of printer represented at a predetermined modulation density, based on the image data shown in FIG. 12.
Figure 14:
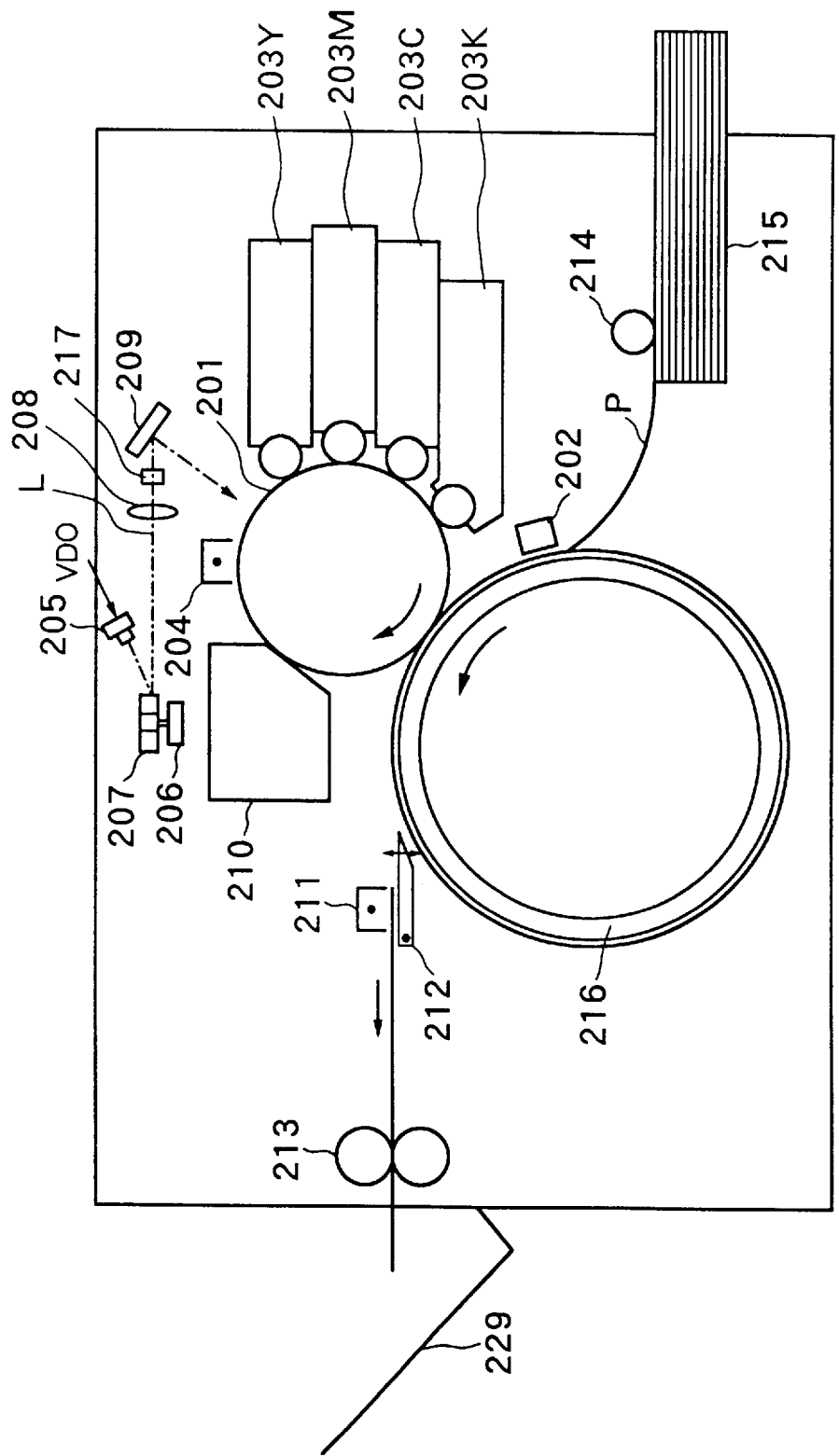
FIG. 14 is a cross-sectional view showing the construction of the conventional full-color printer.
Figure 15:
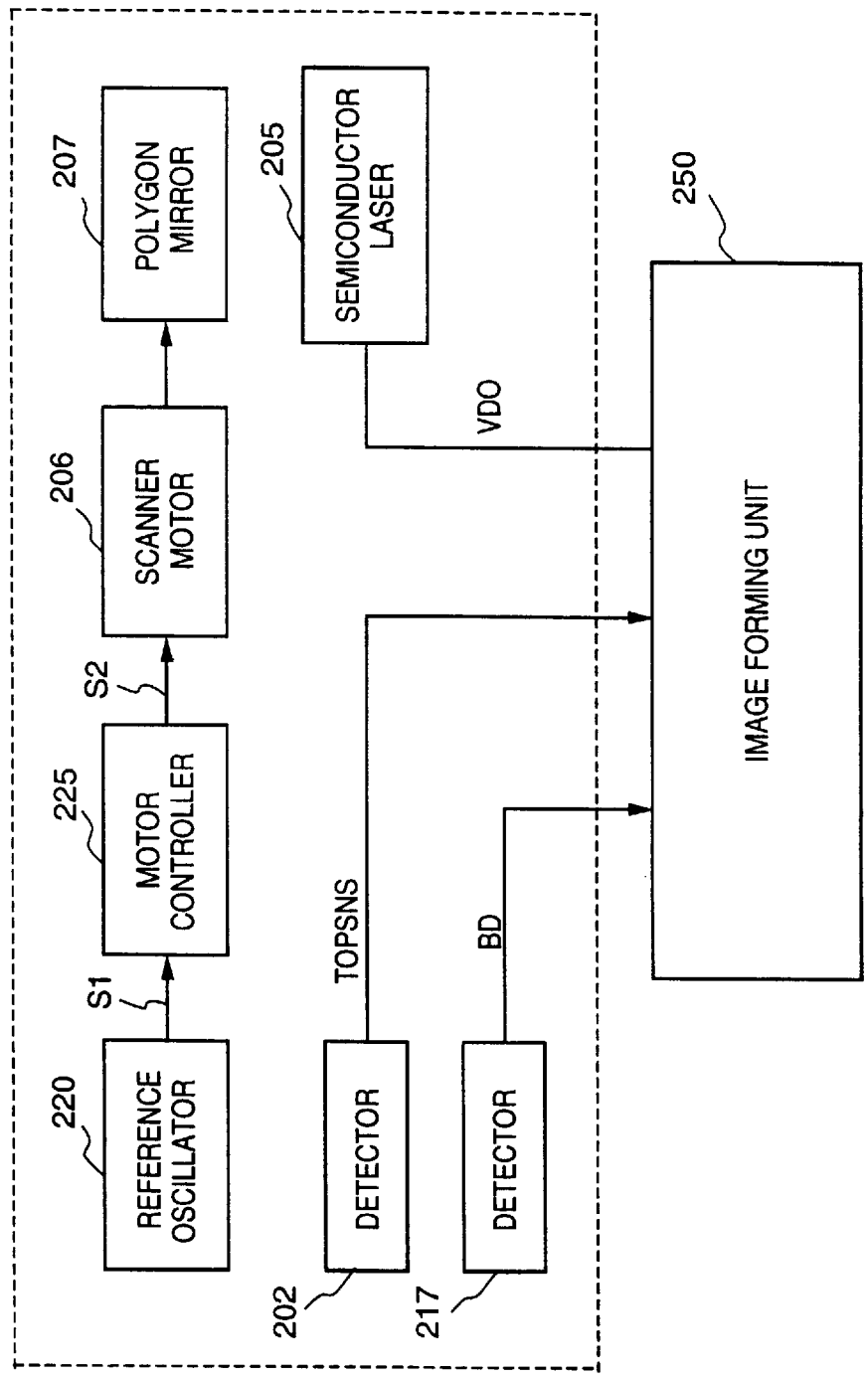
FIG. 15 is a block diagram showing flows of various signals dealt by the full-color printer in FIG. 14.
Figure 16:
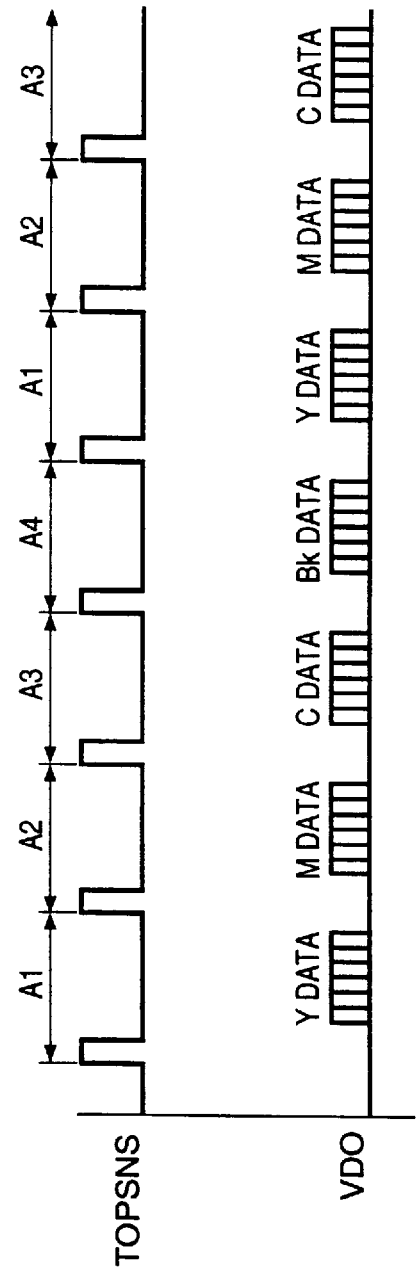
FIG. 16 is a timing chart showing the relation between the TOPSNS signal and the VDO signal.
Figure 17:
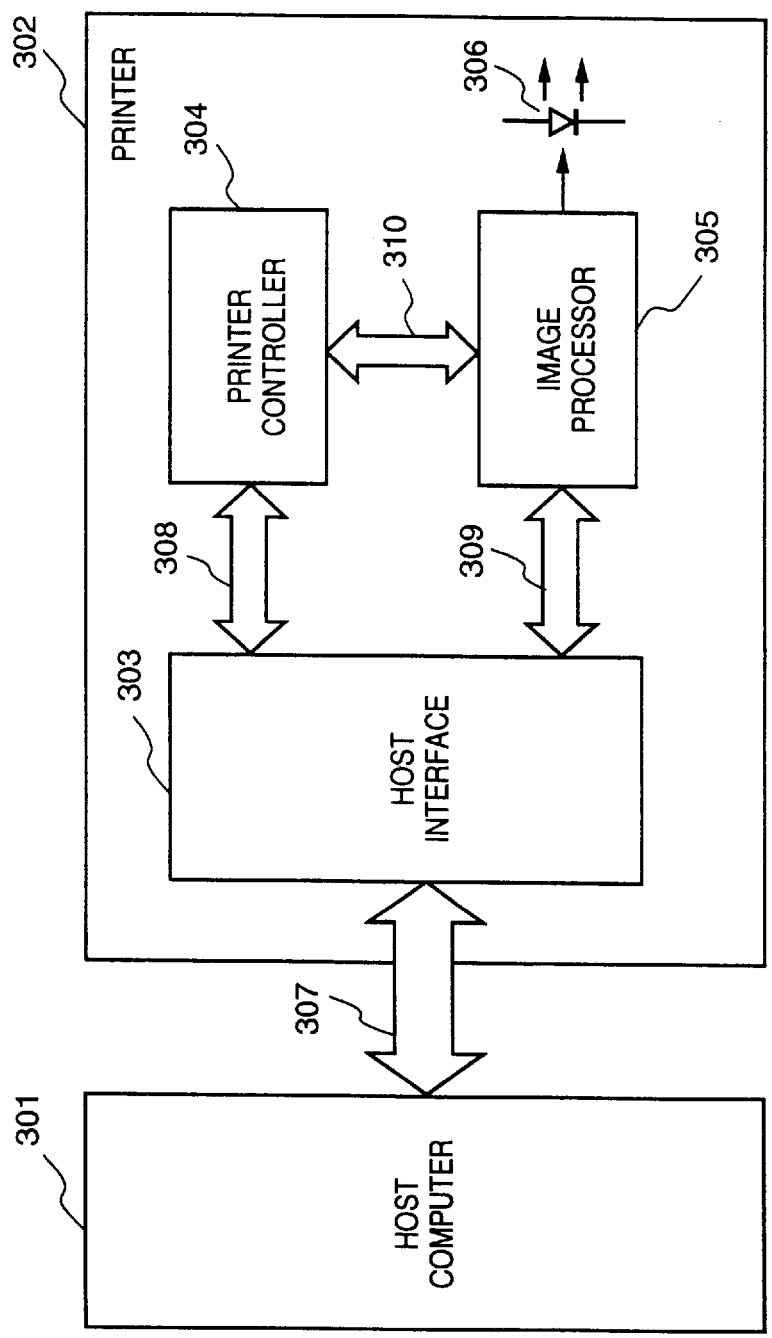
FIG. 17 is a block diagram showing the functional construction of the conventional full-color printer 302.
Figure 18:
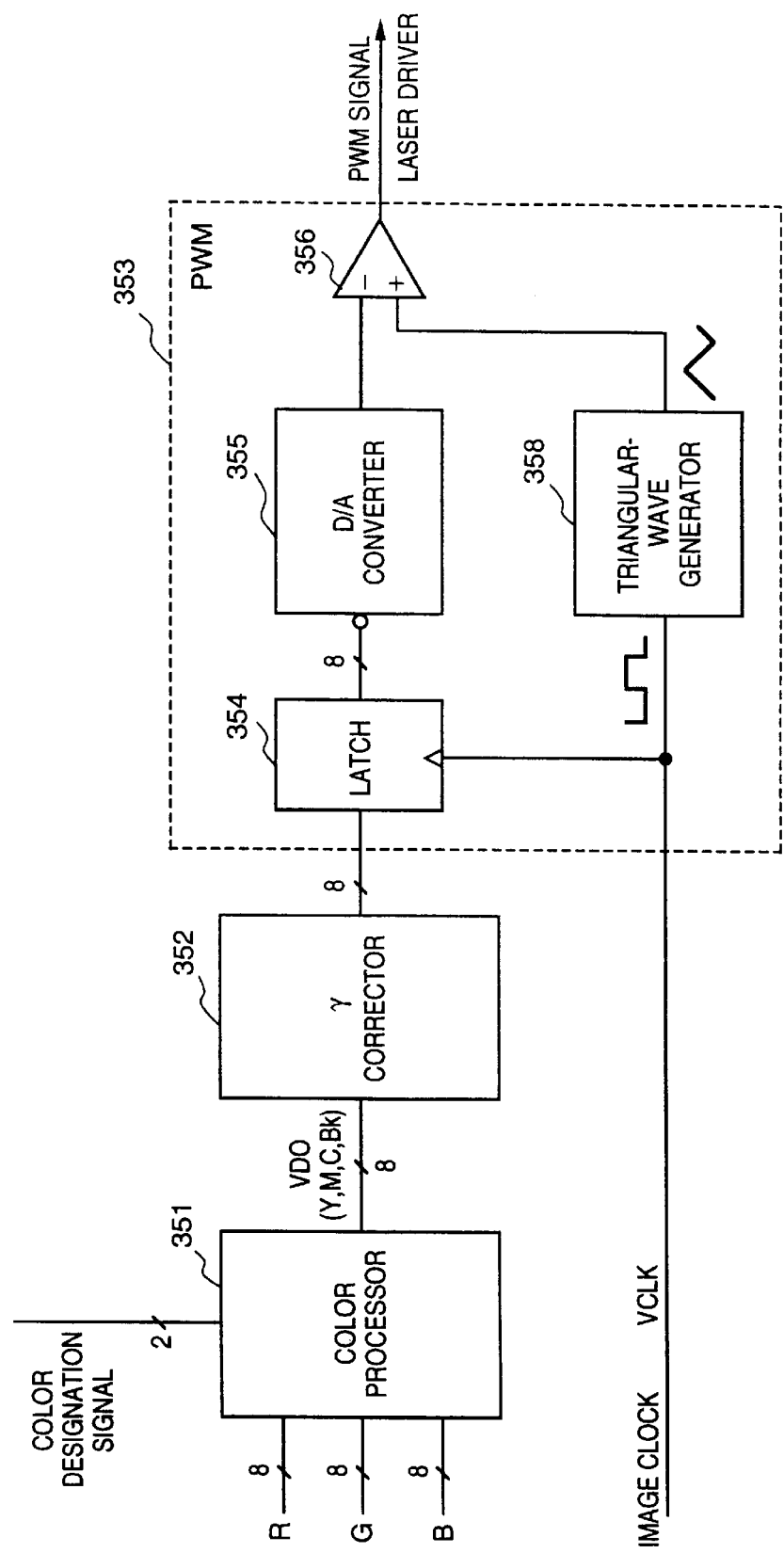
FIG. 18 is a block diagram showing the detailed construction of the image processor 305.

In this embodiment, the overlaying of specific pattern to identify the printer is made by increasing/decreasing the input multivalued image data values by a predetermined value, however, the present invention is not limited to this method. FIG. 12 shows another example of overlaying the printer's manufactured serial number "01101001". In FIG. 12, the value of the number "0" of the printer's manufactured serial number is "00[H]" which is substantially the minimum density value in a 600 dpi image, and the value of the number "1" of the printer's manufactured serial number is "FF[H]" which is substantially the maximum density value. In the next line, the value of a dot directly below the "00[H]" dot is "FF[H]", while the value of a dot directly below the "FF[H]" dot is "00[H]". FIG. 13 shows an output example of image formation using the image data in FIG. 12.

Thus, the pattern representing the printer's manufactured serial number "01101001" is more clearly outputted, and even in a 600 dpi image, the pattern of the printer's manufactured serial number can be exactly and reliably represented in an image. Further, in the above method, information may be added at substantial minimum and maximum densities such as "01[H]" and "FE[H]".

Further, the processing for overlaying a specific pattern to identify the printer is not limited to the above-described method. For example, in the original multivalued image data, each value is changed by adding/subtracting its multiple value to/from the original value.

Further, in the present embodiment, the image signal transferred between the printer controller and the printer engine is a YMCBk density signal, however, the present invention is not limited to this signal. For example, the construction may be arranged such that a color converter (RGB→YMCBk conversion) is provided at the printer engine side for receiving an RGB image signal.

Preferably, to be difficult to discriminate with human eye, the color component of additional information such as a printer's manufactured serial number is yellow. However, this color component may be changed to another color component, otherwise, a plurality of color components may be used for the pattern of the printer's manufactured serial number.

In the embodiment, the printer's manufactured serial number is an 8-bit number as a pattern to specify the printer, however, the present invention is not limited to this arrangement. The identification pattern may be a secret code or encoded company name, otherwise, may be information having data length of 8-bit or longer. Especially, it is preferable that the specific pattern is identification (ID) information given by the supplier of the printer such as a manufacturer or a sales agency.

Further, in the embodiment, the printer is capable of image formation with PWM at 600 dpi resolution and image formation with PWM at 300 dpi resolution, however, the present invention is not limited to this printer. For example, an 800 dpi printer may be employed for image formation at 800 dpi, 400 dpi and 200 dpi resolutions, with PWM or dither processing. In this printer, a specific pattern may be overlaid at 200 dpi resolution which is most stable resolution in electrophotographics. In a case where image formation at 400 dpi resolution is stable, the specific pattern may be formed at 400 dpi resolution.

In the embodiment, the printer comprises the printer controller and the printer engine, however, the present invention is not limited to this construction. For example, the printer controller 2 and the printer engine 3 shown in FIG. 2 may be independent units, and these units can be combined to construct a printer system. Otherwise, the printer controller 2, not incorporating a mechanical portion, and the signal processor 4 may be integrated in one unit, the printer engine 3 except the signal processor 4 may be another unit, and these units may be combined to construct a printer system.

Furthermore, the printer of the embodiment is a full-color printer, however, the present invention is not limited to this printer. For example, a printer capable of image formation at a plurality of resolutions and capable of monochromatic image formation for halftone representation can be employed. Further, the present invention is applicable to a printer system where a printer controller and printer engine are separated from the printer.

As described above, according to the present invention, information to identify a monochromatic image forming apparatus or a color image forming apparatus is added to a part of input multivalued image signal or input multivalued color image signal, and the modulation of the image signal due to the addition of identification information is compensated by modulating multivalued image signal or multivalued color image signal around the part where identification information is added in a reverse manner.

This renders an output image to macroscopically look like an image having no additional information, thus avoids influence on actual image formation. On the other hand, as the identification information is represented on a recording medium with a clear density difference by modulation and reverse modulation upon adding the information, the information can be exactly read by using e.g. a specific image reading device. Accordingly, even though forgery of banknotes or securities might be made, the printer used in the forgery can be easily determined from the formed image. This greatly assists in criminal investigation.

The present invention can be applied to a system constituted by a plurality of devices or to an apparatus comprising a single device.

Furthermore, the invention is also applicable to a case where the invention is embodied by supplying a program to a system or apparatus. In this case, a storage medium, storing a program according to the invention, constitutes the invention. The system or apparatus installed with the program read from the medium realizes the functions according to the invention.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

supplying means for supplying image data;

forming means for forming an image on a medium based on the image data; and adding means for adding predetermined information to the image formed on the medium, wherein the predetermined information is represented by using a plurality of identically-sized units, each unit composed of plural dots, and each of the units includes a first predetermined number of dots having a maximum density and a second predetermined number of dots having a minimum density.

2. The apparatus according to claim 1, wherein the image data is composed of a plurality of color components.

3. The apparatus according to claim 2, wherein said adding means adds the predetermined information to a yellow component of the image.

4. The apparatus according to claim 3, wherein said adding means adds the predetermined information so as to be difficult to discriminate with human eyes.

5. The apparatus according to claim 1, wherein the predetermined information is identification information given by a supplier who supplies the apparatus.

6. The apparatus according to claim 1, wherein each of the units is composed of a single dot having a substantially maximum density and another single dot having a substantially minimum density.

7. An image processing apparatus comprising:

input means for inputting M-valued image data;

adding means for adding predetermined information to the M-valued image data; and output means for outputting the M-valued image data to which the predetermined information had been added by said adding means;

wherein the predetermined information comprises a combination of N fixed density values (M>N), and said adding means converts a part of an image represented by the M-valued image data into a fixed density value.

8. The apparatus according to claim 7, wherein M=256 and N=2.

9. The apparatus according to claim 7, wherein said input means inputs M-valued image data for each of plural color components, and said adding means adds the predetermined information to a yellow component of the plural color components.

10. The apparatus according to claim 7, further comprising image forming means for forming an image represented by the M-valued image data output by said output means.

11. The apparatus according to claim 7, further comprising a host computer for supplying image information representing the M-valued image data.

12. The apparatus according to claim 7, further comprising an image processing unit for generating the M-valued image data by interpreting image information described by a predetermined description language, and for supplying the M-valued image data to said input means.

13. The apparatus according to claim 12, further comprising a host computer for supplying the image information described by the predetermined description language.

14. An image processing method comprising the steps of:

supplying image data;

forming an image on a medium based on the image data; and adding predetermined information to the image formed on the medium, wherein the predetermined information is represented by using a plurality of identically-sized units, each unit composed of plural dots, and each of the units includes a first predetermined number of dots having a maximum density and a second predetermined number of dots having a minimum density.

15. An image processing method comprising:

an input step of inputting M-valued image data;

an adding step of adding predetermined information to the M-valued image data; and an output step of outputting the M-valued image data to which the predetermined information has been added in said adding step;

wherein the predetermined information comprises a combination of N fixed density values (M>N), and a part of an image represented by the M-valued image data is converted into a fixed density value in said adding step.

* * * * *

UNITED STATES PATENT AND TRADEMARK OFFICE
CERTIFICATE OF CORRECTION

PATENT NO. : 5,832,186

DATED : November 3, 1998

INVENTOR : TAKASHI KAWANA

It is certified that error appears in the above-identified patent and that said Letters Patent is hereby corrected as shown below:

On the tile page, item [56]

References Cited

Please insert:

--OTHER PUBLICATIONS

Komatsu et al., "A Proposal on Digital Watermark in Document Image Communication and Its Application to Realizing a Signature", Electronics and Communications in Japan, Part 1, Vol. 73, No. 5, pp. 22-33 (1990).--

<u>COLUMN 15</u>

Line 41, "means;" should read --means,--.

Signed and Sealed this

Twenty-seventh Day of July, 1999

Attest:

Q. TODD DICKINSON

*Attesting Officer*     *Acting Commissioner of Patents and Trademarks*